United States Patent
McKee et al.

[11] Patent Number: 6,151,543
[45] Date of Patent: Nov. 21, 2000

[54] METHOD AND APPARATUS FOR SKIP SHIFTING IN A POWER TRANSMISSION

[75] Inventors: Kevin D. McKee, Naperville, Ill.; Jeffrey S. Milender, Valley City, N. Dak.

[73] Assignee: Case Corporation, Racine, Wis.

[21] Appl. No.: 09/232,006

[22] Filed: Jan. 14, 1999

[51] Int. Cl.[7] .................................................. G06F 7/00
[52] U.S. Cl. ............................ 701/55; 701/56; 701/64; 701/67; 74/336 R; 477/78
[58] Field of Search ........................... 701/51, 55, 56, 701/58, 60, 61, 62, 64; 74/335, 336 R; 477/94, 148, 70, 123, 124, 125, 120, 115, 78; 192/3.58, 3.65

[56] References Cited

U.S. PATENT DOCUMENTS

| | | | |
|---|---|---|---|
| 4,576,065 | 3/1986 | Speranza et al. | 701/55 |
| 4,648,290 | 3/1987 | Dunkley et al. | 701/52 |
| 5,036,718 | 8/1991 | Bulgrien | 701/52 |
| 5,233,525 | 8/1993 | Overmann et al. | 701/55 |
| 5,277,290 | 1/1994 | Lasoen | 192/3.62 |
| 5,335,566 | 8/1994 | Genise et al. | 701/52 |
| 5,416,700 | 5/1995 | Bates et al. | 701/66 |
| 5,506,771 | 4/1996 | Chan et al. | 701/54 |
| 5,611,245 | 3/1997 | McKee | 74/336 R |
| 5,778,330 | 7/1998 | McKee | 701/62 |
| 5,790,969 | 8/1998 | McKee | 701/51 |
| 5,809,441 | 9/1998 | McKee | 701/51 |
| 5,845,224 | 12/1998 | McKee | 701/56 |
| 5,875,410 | 2/1999 | Fowler et al. | 701/61 |
| 5,916,291 | 6/1999 | McKee | 701/55 |

*Primary Examiner*—Jacques H. Louis-Jacques
*Attorney, Agent, or Firm*—Foley & Lardner

[57] ABSTRACT

An electronic control system for a transmission in a work vehicle such as an agricultural tractor is disclosed herein. The system includes sensors for detecting the output speed of the vehicle engine, the output speed of the transmission and the vehicle ground speed. Command devices are available to the vehicle operator for generating command signals, such as for commanding the direction of movement, as well as forward and reverse gear ratios. A controller receives signals from the sensors and command devices, and controls engagement and disengagement of combinations of fluid clutches in the transmission to obtain desired gear ratios between the transmission input and output shafts. The command devices include an input device for generating transmission command signals, and the controller responds by selectively engaging the clutches to shift the transmission at a predetermined shift rate. The controller determines a commanded gear ratio based at least in part on the transmission command signals. When the commanded gear ratio differs from the current gear ratio by more than a predetermined number of gear ratios, the controller accesses a table stored in a memory circuit to determine a skip shift value associated with the current gear ratio and selectively engages the clutches to skip shift from the current gear ratio to the commanded gear ratio by a number of gear ratios determined by the accessed skip shift value.

26 Claims, 9 Drawing Sheets

METHOD AND APPARATUS FOR SKIP SHIFTING IN A POWER TRANSMISSION

FIELD OF THE INVENTION

The invention relates generally to control of a power transmission in a work vehicle such as an agricultural tractor. More particularly, the invention relates to an improved method and apparatus for skip shifting in such transmissions.

BACKGROUND OF THE INVENTION

In the field of transmission systems for work vehicles, such as agricultural tractors and construction vehicles, various transmission configurations and control schemes have been proposed and are in use. Such transmissions typically include a collection of intermeshing gears either fixed to transmission shafts or rotating freely on the shafts. Clutches associated with the freely rotating gears may be selectively engaged to establish a series of speed ratios between an engine output shaft and a transmission output shaft to transmit engine torque at a desired speed to driven wheels of the vehicle. Control systems for commanding engagement of the clutches typically include electronic circuitry that responds to operator controls, such as an upshift/downshift lever, a forward/reverse lever and the like in the vehicle cab. The control system sends electric signals to hydraulic valves that channel pressurized fluid to the clutches. The control systems cause the clutches to engage and disengage in predetermined combinations to accelerate, decelerate and drive the vehicle as desired by the operator. Transmissions and control systems of this type are described in U.S. Pat. No. 4,425,620, assigned to Steiger Tractor, Inc., and U.S. Pat. No. 4,967,385, assigned to J. I. Case Company.

The electronic systems for controlling transmissions of large, off-road work vehicles typically provide for various modes of operation and for control of a large number of forward and reverse gear ratios. The various operation modes and large number of gear ratios allow an operator to efficiently and accurately control the movement of these vehicles under a variety of differing load conditions without overloading the engine or clutches of the drivetrain, and without causing engine overspeed. The operator may use an upshift/downshift control lever to request a speed change via the selection of an appropriate gear ratio, wherein the selection occurs by control of solenoid valves which control engagement of hydraulic clutches corresponding to the appropriate gear ratio. In a certain system configured for operation in a forward manual mode, actuation of the control lever causes the system to upshift by a single gear ratio change to the next higher gear ratio. To allow upshifts by more than one gear ratio, the control lever can be held in its actuated position to cause the system to sequentially upshift by a single gear ratio at a time at a predetermined shift rate to obtain a desired gear ratio.

However, due to the large number of gear ratios provided by the transmissions of work vehicles, sequentially shifting through each intermediate gear ratio between a current gear ratio and a desired gear ratio can adversely affect vehicle operation. For example, since each upshift takes a certain length of time (e.g., 0.75 seconds), the rate of acceleration for such vehicles can be limited, and may be too low under conditions such as when the vehicles enter the stream of traffic on a road, or when the vehicles cross a highway. There are at least three situations wherein sequential shifting through each intermediate gear ratio can be disadvantageous: when the shift lever changes the commanded gear ratio faster than the shift rate of the transmission; during transmission engagement from neutral to a selected forward or reverse gear ratio; and during shuttle shifting operations.

Problems associated with sequentially shifting through each intermediate gear ratio can be particularly troublesome during shuttle shifting, wherein the transmission is continually shifted between a desired forward gear ratio and a desired reverse gear ratio. In one work vehicle equipped with a forward-neutral-reverse-park (FNRP) selection lever and a gear ratio "bump" lever for incrementing and decrementing the commanded gear ratio, the bump lever is used to preselect forward and reverse gear ratios to which the transmission will be shifted during shuttle shifting, while the FNRP lever is used to continually shift between the preselected forward gear ratio and the preselected reverse gear ratio.

A solution to these problems is known as "skip shifting", wherein the transmission control system skips some intermediate gear ratios between the current and the desired gear ratios. For example, the transmission control system shown in U.S. Pat. No. 5,233,525, commonly assigned to Case Corporation and incorporated herein by reference, includes an upshift/downshift control operated by a pulser lever to provide upshift and downshift pulses to an electronic controller. A skip shift control including a button is located at the distal end of the pulser lever. Actuation of the skip shift button by the vehicle operator causes an electrical signal to be sent to the controller. In response, the controller selects an alternative gear selection control program which alters the sequence of engaged gear ratios from continuous sequential selection of all gear ratios to only a portion thereof. By skipping certain gear ratios from the sequence of engaged gear ratios, performance is enhanced.

Although the above-described control system advantageously provides for skip shifting of a power transmission to enhance vehicle acceleration, the system requires actions by the operator before skip shifting may be invoked. In particular, before skip shifting occurs, the operator must determine that skip shifting would be desirable for the particular conditions faced by the vehicle, and must also depress the skip-shift button accordingly. These actions must occur at the same time that the operator is performing a variety of other actions, such as watching for traffic and steering the vehicle as the vehicle enters the stream of traffic on a road or crosses a highway. Due to other tasks facing the operator, the skip-shift button may not be actuated at the correct time, or may not be actuated at all, thereby obviating the benefits of having the skip shifting function in the first place.

Other transmission systems provide a shift "bump" switch located on the gear shift lever. Moving the gear shift lever causes the controller to upshift or downshift the transmission into the respective adjacent gear ratio. Actuating the shift bump switch while the gear shift lever is being moved causes the controller to bump the gear ratio up or down every other gear ratio to move through the gear ratios faster. As with the previously-described system, however, this system puts the burden on the operator to actuate the shift bump switch at the appropriate times. Also, bumping the transmission by a constant number of gear ratios may adversely affect shift quality under certain conditions depending on the current gear ratio of the transmission, the load on the vehicle, and the engine/transmission combination. For example, skip upshifting by a constant number of gear ratios under certain conditions may put too large an instantaneous load on the engine, and may cause the engine to lug down. Conversely, skip downshifting by a constant number of gear ratios under other conditions may decrease the instantaneous load on the engine too quickly, and may cause an engine overspeed and possible engine damage.

Thus, it would be advantageous to provide a transmission control system capable of performing automatic skip shifts without contemporaneous input from the operator. It would also be advantageous if such a control system could provide for skip shifting by a variable number of gear ratios depending upon the current gear ratio of the transmission to provide acceptable shift quality throughout the entire range of gear ratios. It would be advantageous to provide a transmission control system which provides for automatic and variable skip shifting when the transmission is in one of certain predetermined gears, while disabling skip shifting in other predetermined gears. In addition, it would be advantageous to provide a control system wherein such skip shifting is implemented in a straight-forward manner easily adaptable for different vehicle applications. Further, it would be advantageous to provide a transmission control system wherein direct engagement of certain gear ratios is allowed, and skip shifting is provided for other ratios.

SUMMARY OF THE INVENTION

One embodiment of the invention provides a control system for a transmission in a work vehicle including an engine and driven wheels. The transmission is coupled between the engine and driven wheels and includes gears and associated clutches which are engageable in predetermined combinations by an actuating circuit to define gear ratios between an output speed of the engine and an output speed of the transmission. The control system includes an operator-actuated input device for generating transmission command signals, a memory circuit for storing independent skip shift values associated with particular gear ratios, and a control circuit coupled to the input device and memory circuit. The control circuit responds to the transmission command signals by selectively engaging the clutches at a predetermined shift rate to shift to a current gear ratio, and determines a commanded gear ratio based at least in part on the transmission command signals. When the commanded gear ratio differs from the current gear ratio by more than a predetermined number of gear ratios, the control circuit accesses the memory circuit to determine the skip shift value associated with the current gear ratio and selectively engages the clutches to skip shift from the current to the commanded gear ratio by a number of gear ratios determined by the accessed skip shift value.

Another embodiment of the invention provides a control system for a transmission in a work vehicle including an engine and driven wheels. The transmission is coupled between the engine and driven wheels and includes gears and associated clutches which are engageable in predetermined combinations by an actuating circuit to define gear ratios between an output speed of the engine and an output speed of the transmission. The control system includes an operator-actuated input device with upshift and downshift command positions for generating upshift and downshift signals, a memory circuit for storing independent skip shift values in association with particular gear ratios, and a control circuit coupled to the input device and memory circuit. The control circuit receives the upshift and downshift signals from the input device, and selectively engages the clutches to upshift and to downshift in response to the upshift and the downshift signals, respectively. The upshifts and downshifts occur at predetermined shift rates to shift into a current gear ratio. The control circuit determines a commanded gear ratio based on the upshift and downshift signals received from the input device and, when the commanded gear ratio differs from the current gear ratio by more than a predetermined number of gear ratios, the control circuit accesses the memory circuit to determine the skip shift value associated with the current gear ratio and selectively engages the clutches to skip shift from the current gear ratio to the commanded gear ratio by a number of gear ratios determined by the accessed skip shift value.

Another embodiment of the invention provides a control system for a transmission in a work vehicle including an engine and driven wheels. The transmission is coupled between the engine and driven wheels and has gears and associated clutches which are engageable in predetermined combinations by an actuating circuit to define gear ratios between an output speed of the engine and an output speed of the transmission. The control system includes actuating means for commanding upshifts and downshifts of the transmission, memory means for storing independent skip shift values in association with particular gear ratios, and first control means for selectively engaging the clutches to upshift and downshift the transmission to provide a current gear ratio as commanded by the actuating means. The upshifts and downshifts occur at predetermined shift rates. The control system also includes second control means for determining a commanded gear ratio and, when the commanded gear ratio differs from the current gear ratio by more than a predetermined number of gear ratios, for accessing the memory means to determine the skip shift value associated with the current gear ratio and selectively engaging the clutches to skip shift from the current gear ratio to the commanded gear ratio by a number of gear ratios determined by the accessed skip shift value.

Another embodiment of the invention provides a method of controlling a transmission in a work vehicle having an engine and driven wheels. The transmission is coupled between the engine and driven wheels and includes gears and associated clutches which are engageable in predetermined combinations by an actuating circuit to define gear ratios between an output speed of the engine and an output speed of the transmission. The method includes storing independent skip shift values in a memory in association with particular gear ratios, actuating an input device to command shifts, and selectively engaging the clutches to shift at predetermined shift rates to provide a current gear ratio as commanded by the input device. The method includes determining a commanded gear ratio based on the input device actuations, comparing the commanded and current gear ratios and, when the gear ratios differ by more than a certain number of gear ratios, accessing the memory to determine the skip shift value associated with the current gear ratio and selectively engaging the clutches to skip shift from the current to commanded gear ratio by a number of gear ratios determined by the accessed skip shift value.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
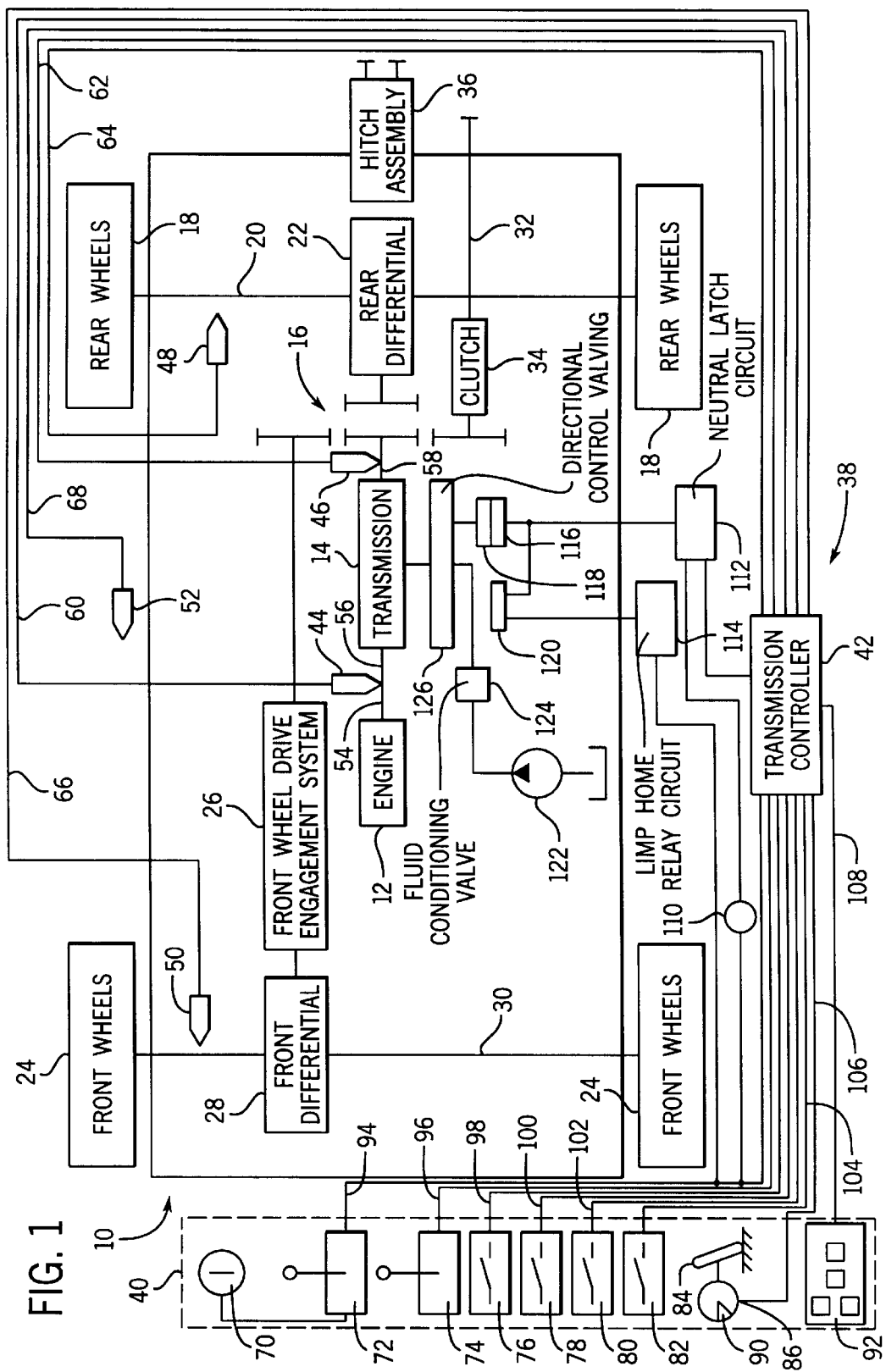
FIG. 1 is a diagrammatical view of a work vehicle incorporating an exemplary transmission control system.

Referring to FIG. 1, a vehicle, such as an agricultural tractor, designated by reference numeral 10, includes an engine 12 mechanically coupled to a transmission 14. Transmission 14 selectively drives gearing, designated generally by the reference numeral 16, at various gear ratios as commanded by an operator and controlled by a controller as described below. Gearing 16 drives rear wheels 18 mounted on a rear axle 20 through a rear differential 22. Gearing 16 preferably also permits transmission 14 to drive front wheels 24 through a front wheel drive engagement system 26, front differential 28 and front axle 30. Gearing 16, differentials 22 and 28 and front wheel drive engagement system 26 may be of generally known construction. Gearing 16 is also coupled to a power take off shaft 32 through a power take off clutch 34 for driving various implements (not shown) which may be coupled to vehicle 10, such as on a hitch assembly 36.

The operation of transmission 14 is controlled by a control system 38 including operator command devices located in an operator station 40, such as in a covered vehicle cab (not shown), and a transmission controller 42 coupled to operator station 40 and to instrumentation and control circuitry as described below.

As shown in FIG. 1, instrumentation for control system 38 preferably includes speed sensors 44, 46, 48, 50 and a ground speed sensor 52. Speed sensor 44 is associated with an engine output shaft 54 linking engine 12 to transmission 14, or with a transmission input shaft 56 coupled to shaft 54. Speed sensor 46 is associated with a transmission output shaft 58. Speed sensors 44 and 46 may be of any suitable type, such as a magnetic proximity sensor associated with a toothed timing gear (not shown). Sensors 44 and 46 produce electrical signals representative of the rotational speed of shafts 54 (or 56) and 58, respectively, and apply these speed signals to transmission controller 42 through data communication lines 60 and 62, respectively. Speed sensors 48 and 50, which may be substantially identical to speed sensors 44 and 46, are associated with rear axle 20 and front axle 30, respectively. Sensors 48 and 50 produce electrical signals representative of the rotational speed of axles 20 and 30, and apply these signals to transmission controller 42 via communication lines 64 and 66, respectively. Ground speed sensor 52 preferably includes a radar emitter and receiver unit, and is secured on vehicle 10, directed generally downwardly. Ground speed sensor 52 produces an electrical signal representative of the vehicle ground speed and applies this signal to transmission controller 42 via a communication line 68.

The signals produced by sensors 44, 46, 48, 50 and 52 are used as control inputs by controller 42 as described below. In other situations, control system 10 may include more or fewer speed sensors, such as where the signals produced by one or more of sensors 44, 46, 48, 50 and 52 are redundant, or where a signal representative of the parameter sensed by a particular sensor is available from an alternative source. For example, as described below, ground speed sensor 52 provides an indication of the ground speed of vehicle 10. However, where front axle 30 is not positively driven by engine 12, the output of speed sensor 50 may be used for this purpose, or speed sensor 50 may be eliminated from the system and only ground speed sensor 52 used for the ground speed-related signal.

Operator station 40 includes a key switch 70, a forward-neutral-reverse-park (FNRP) selection lever 72, a gear ratio increment and decrement, or "bump" lever 74, an automatic/manual selection switch 76, a diagnostic request switch 78 and a creeper switch 80. System 38 may include switches for additional operator commanded inputs 82. Interconnections between these components and transmission controller 42 are described below. Generally, however, key switch 70 permits an operator to selectively enable and disable the operation of vehicle 10 and transmission 14. FNRP lever 72 may be placed in four stable positions, including "forward," "reverse," "neutral" and "park," and permits an operator to selectively command controller 42 to shift transmission 14 into various forward, reverse and neutral gear ratios for driving vehicle 10 in a desired direction of travel and at desired speeds, and to lock transmission 14 in a "parked" configuration. Bump lever 74 allows the operator to increment or decrement the selected gear ratio and to preselect forward and reverse gear ratios to which transmission 14 will be shifted. Alternatively, bump lever 74 may be replaced by a bump switch, such as a center-loaded rocker switch having an increment position, a decrement position, and a spring-centered position therebetween. The bump switch may be located, for example, in a throttle lever used to control engine speed. Selection switch 76 permits the operator to override certain automatic control functions of controller 42 as described below. Creeper switch 80 allows the operator to selectively engage an extremely low range of gear ratios where corresponding creeper gearing and a creeper clutch are provided in transmission 14 as described below.

Operator station 40 also includes a clutch pedal 84 coupled to a position sensor 86 and a bottom-of-clutch switch 90. Movement of clutch pedal 84, sensed by position sensor 86 and switch 90, permits a vehicle operator to regulate certain control functions of controller 42 as described below. Position sensor 86 may be of any suitable type, such as a rotary or linear potentiometer, which generates a signal representative of the position of clutch pedal 84. Bottom-of-clutch switch 90 is a two-position switch that provides a signal to controller 42 indicating when clutch pedal 84 is in its fully depressed position. To determine when clutch pedal 84 is in its fully raised position, controller 42 checks whether the signal from position sensor 86 is above a predetermined threshold. Alternatively, a physical top-of-clutch switch can be used. In addition, operator station 40 includes a visual display 92 for providing an operator with information relating to the state of transmission 14 (e.g., direction and level of selected gears, diagnostic codes).

Levers 72 and 74, and switches 76, 78, 80 and 82 are linked to transmission controller 42 via communication lines 94, 96, 98, 100, 102 and 104, respectively, and apply operator-induced command signals to controller 42 through their respective lines. Sensor 86, and bottom-of-clutch switch 90 are similarly linked to controller 42 via one or more communication lines 106. Display 92 receives data from controller 42 via a similar communication line 108, typically in the form of a conductor bundle or instrumentation harness.

In addition to supplying command signals to controller 42, FNRP lever 72 is coupled to controller 42 through a neutral relay circuit 110 and a neutral latch circuit 112 for selectively placing and maintaining transmission 14 in a neutral condition. Moreover, FNRP lever 72 is also coupled to a limp home relay circuit 114 for selectively permitting vehicle 10 to be placed in preselected limp home gear ratios in the event of a system failure. The preferred structure and function of relay circuits 110, 112 and 114 is described below. Neutral latch relay circuit 112, a park switch (described below) and controller 42 are coupled to a plug connector 116 through which controller 42 provides control signals for regulating the operation of transmission 14. In normal operation, plug connector 116 is joined to a mating connector 118, whereas the latter mating connector 118 may be coupled to a limp home plug connector 120 for providing alternative circuitry paths ensuring limited transmission operation in the event of system failure as described below.

At the direction of control signals from controller 42, communicated through plug connectors 116 and 118, transmission 14 may be engaged in several distinct gear ratios via a hydraulic circuit that includes a fluid pump 122, fluid conditioning valving 124 and directional control valving 126. Pump 122 may be of any suitable type, such as a hydraulic gear pump, and will typically be coupled to engine 12 for pressurizing hydraulic fluid for use in engaging selected clutches of transmission 14. Fluid conditioning valving 124 typically includes a pressure relief valve (not shown) for limiting system pressure, and appropriate pressure regulating valves. Directional control valving 126 includes a bank of spring-biased, two-position, three-way valves plumbed to receive pressurized fluid from valving 124 and to selectively direct the fluid to transmission 14. Each directional control valve in valving 126 includes a solenoid which may be energized by a control signal from controller 42 to shift the associated valve from a closed position to an open position to actuate or engage a fluid clutch within transmission 14.

Figure 2:
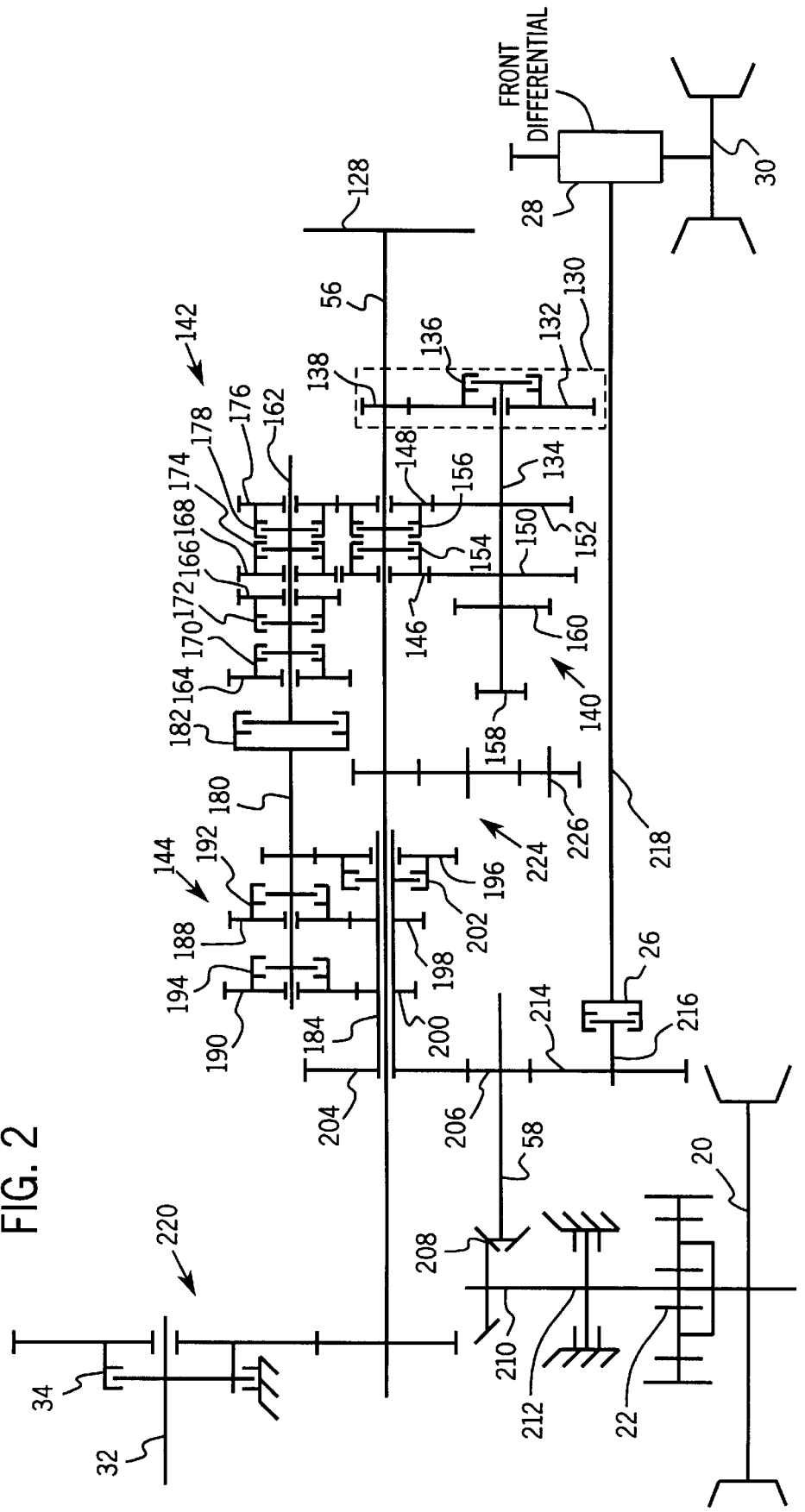
FIG. 2 is a diagrammatical view of a vehicle transmission of the type controlled by the system illustrated in FIG. 1.

Turning more particularly to the structure and operation of transmission 14, while any of a variety of transmissions may be controlled by control system 38, FIG. 2 illustrates the presently preferred configuration. Transmission 14 is of a type known generally as a "powershift transmission," wherein several sets of gears are associated with transmission shafts and certain of the gears may be selectively rotationally fixed with respect to their shafts by engagement of an associated fluid clutch to define desired gear ratios between input shaft 56 and output shaft 58. An engine drive plate 128 is driven in rotation by the vehicle engine. Drive plate 128 is coupled to transmission input shaft 56 and powers drive shaft 56 in rotation. Gear sets, along with associated fluid clutches and transmission shafts permit a number of different gear ratio combinations to be defined for driving transmission output shaft 58 at desired speeds as follows.

A creeper gear set 130 includes a creeper gear 132 mounted on and rotational with respect to a second transmission shaft 134. A creeper clutch 136 is engageable to lock creeper gear 132 against rotation on shaft 134. Creeper gear set 130 also includes a gear 138 fixed to shaft 56 and continuously meshing with creeper gear 132. Engagement of creeper clutch 136 results in driving shaft 134 through gears 138 and 132 to obtain an extremely slow output speed of shaft 58. Creeper gear set 130 may be optionally excluded from transmission 14.

Transmission 14 includes three groups of gear sets 140, 142 and 144. First group 140 includes first and second gears 146 and 148 supported on and rotational with respect to shaft 56. Additional gears 150 and 152, fixed on second shaft 134 mesh continuously with gears 146 and 148, respectively. Fluid clutches 154 and 156 are associated with gears 146 and 148, respectively, and may be engaged to lock their associated gear against rotation on shaft 56. In operation, either clutch 154 or clutch 156 is engaged to obtain an input-to-output gear ratio, or both clutches may be released or disengaged to interrupt the transmission of power to shaft 134. In the embodiment shown, gear combination 146 and 150 define a ratio of 34:39, while gears 148 and 152 have a ratio of 37:37.

Second gear set group 142 includes gear 150, and additional gears 158 and 160, all fixed on second shaft 134. Supported on a third transmission shaft 162 and rotational with respect to third shaft 162, three gears 164, 166 and 168 mesh continuously with gears 158, 160 and 152, respectively. Fluid clutches 170, 172 and 174 are associated with gears 164, 166 and 168, respectively, and may be engaged to lock the associated gear against rotation on shaft 162. Thus, either one of clutches 170, 172 or 174 may be engaged to transmit power between second shaft 134 and third shaft 162, or all of the clutches may be released to interrupt power transmission between the shafts. In the embodiment illustrated, gear combination 158 and 164 provide a gear ratio of 29:44, combination 160 and 166 provide a ratio of 34:39, and combination 150 and 168 provide a ratio of 39:34.

A reverse gear set is provided adjacent to second gear set group 142 on shaft 162, and includes a reverse gear 176 mounted on and rotational about shaft 162. A reverse clutch 178 is associated with reverse gear 176 and may be engaged to lock reverse gear 176 against rotation with respect to shaft 162, placing transmission 14 in one of several reverse gear ratios.

Third shaft 162 is aligned with and may be selectively coupled to a fourth transmission shaft 180 via a master clutch 182. When master clutch 182 is fully engaged, shaft 180 rotates at the same speed and in the same direction as shaft 162. As discussed below, master clutch 182 is preferably modulated into and out of engagement, such as by pulse-width-modulating a proportional directional control valve (not shown) included in valving 126. However, master clutch 182 may also be mechanically or electro-mechanically modulated by other known techniques.

Third gear set group 144 selectively couples shaft 180 with a further shaft 184 disposed about shaft 56. Third gear set group 144 includes a first gear 186 fixed to shaft 180, and a pair of gears 188 and 190 supported on and rotational with respect to shaft 180. Clutches 192 and 194 are associated with gears 188 and 190, respectively, and may be engaged to lock the associated gear against rotation on shaft 180. Gears 186, 188 and 190 mesh continuously with corresponding gears 196, 198 and 200, respectively, on shaft 184. Gear 196 is supported on and rotational with respect to shaft 184, whereas gears 198 and 200 are fixed to shaft 184. A fluid clutch 202 is associated with gear 196 and may be engaged to lock gear 196 against rotation on shaft 184. Thus, by selectively engaging either clutch 192, 194 or 202, shaft 184 is caused to rotate at a predetermined speed ratio as shaft 180 is driven in rotation. In the presently preferred embodiment, gear combination 186 and 196 provide a gear ratio of 22:54, combination 188 and 198 provide a ratio of 37:39, and combination 190 and 200 provide a ratio of 52:24.

Shaft 184 transmits power to transmission output shaft 58 via gears 204 and 206, fixed on shafts 184 and 58 respectively and arranged to continuously mesh with one another. Output shaft 58 transmits power to rear axle 20 through bevel gears 208 arranged to drive a differential input shaft 210. A master brake 212 is provided on shaft 210 for braking vehicle 10. In addition to driving rear axle 20, gear 206 carried by output shaft 58 meshes with a further gear 214 supported on a front wheel drive clutch shaft 216. A front wheel drive shaft 218 may be selectively coupled to clutch shaft 216 by front wheel drive clutch 26, and extends to front wheel drive differential 28 for driving front axle 30.

In addition to the gearing described above, transmission 14 is preferably arranged for driving power take off shaft 32 via power take off gearing 220, including power take off clutch 34. Transmission 14 also includes gearing, designated generally by reference numeral 224, for driving a pump drive shaft 226.

All of the clutches in transmission 14 are preferably fluid clutches. Such clutches are typically biased in a disengaged position and engageable by the application of pressurized fluid. Moreover, while clutches 154, 156, 170, 172, 174, 178, 192, 194 and 202 may be modulated into and out of engagement, such as by gradually shifting a proportional hydraulic valve in valving 126, in the present embodiment, these clutches are engaged by hydraulic valves that are shifted directly between pressure transmitting and pressure relieving positions. However, to permit smooth transitions in shifting, master clutch 182 is controlled with an analog current plus a dither signal. The control signals to the current regulator are pulse width modulated signals that are low-pass filtered to provide a DC level. Master clutch 182 may also be modulated into and out of engagement by pulse width modulating a proportional directional control valve in valving 126. Thus, direct shifting between selected gears, commonly known as power shifting, may be performed by disengaging outgoing clutches (corresponding to the gear ratio being shifted from) while engaging incoming clutches (for the gear ratio being shifted to), in a coordinated and timed manner with master clutch 182 engaged. In appropriate situations where transmission 14 is to be shifted over a broad range of gear ratios, certain intermediate gear ratios may be skipped, in accordance with a technique referred to herein as "skip shifting". On the other hand, modulated shifting may be commanded by fully engaging clutches corresponding to a desired gear ratio with master clutch 182 disengaged, then modulating engagement of master clutch 182. Such modulated shifting is extremely useful in certain shifting situations, such as starting from a stop and shuttle shifting between forward and reverse gear ratios.

Controller 42 may command all these types of shifting depending upon the operating conditions of transmission 14. Techniques for power shifting and shuttle shifting are well known. For example, such techniques are described in U.S. Pat. No. 4,967,385, assigned to J. I. Case Company and incorporated herein by reference. Transmission 14 may execute power shifts both while upshifting to higher gear ratios in the same direction and while downshifting to lower gear ratios in the same direction. Similarly, transmission 14 may execute modulated shuttle shifts both from forward gear ratios to reverse gear ratios and vice versa.

By engaging combinations of clutches, transmission 14 establishes a number of predetermined gear ratios between input shaft 56 and output shaft 58. The following gear ratios are provided (the prefixes F, R, C and CR represent forward, reverse, forward creeper and reverse creeper gear ratios, respectively):

| Gear ratio | Clutches engaged |
|---|---|
| F1 | 154, 170, 202; |
| F2 | 156, 170, 202; |
| F3 | 154, 172, 202; |
| F4 | 156, 172, 202; |
| F5 | 154, 174, 202; |
| F6 | 156, 174, 202; |
| F7 | 154, 170, 192; |
| F8 | 156, 170, 192; |
| F9 | 154, 172, 192; |
| F10 | 156, 172, 192; |
| F11 | 154, 174, 192; |
| F12 | 156, 174, 192; |
| F13 | 154, 170, 194; |
| F14 | 156, 170, 194; |
| F15 | 154, 172, 194; |
| F16 | 156, 172, 194; |
| F17 | 154, 174, 194; |
| F18 | 156, 174, 194; |
| R1 | 154, 178, 202; |
| R2 | 156, 178, 202; |
| R3 | 154, 178, 192; |
| R4 | 156, 178, 192; |
| C1 | 136, 170, 202; |
| C2 | 136, 172, 202; |
| C3 | 136, 174, 202; |
| C4 | 136, 170, 192; |
| C5 | 136, 172, 192; |
| C6 | 136, 174, 192; |
| CR1 | 136, 178, 202; |
| C42 | 136, 178, 192 |

For forward gear ratios, only one clutch of each gear set group 140, 142 and 144 is engaged. Similarly, for reverse gear ratios, the reverse gear clutch 178 is engaged along with a clutch from the first and third gear set groups 140 and 144. Moreover, for creeper gear ratios, the creeper clutch 136 is engaged along with a clutch from the second gear set group 142 (or reverse gear clutch 178) and a clutch from the third gear set group 144. All the combinations require engagement of master clutch 182 for transmission of power through transmission 14.

Figure 3A:
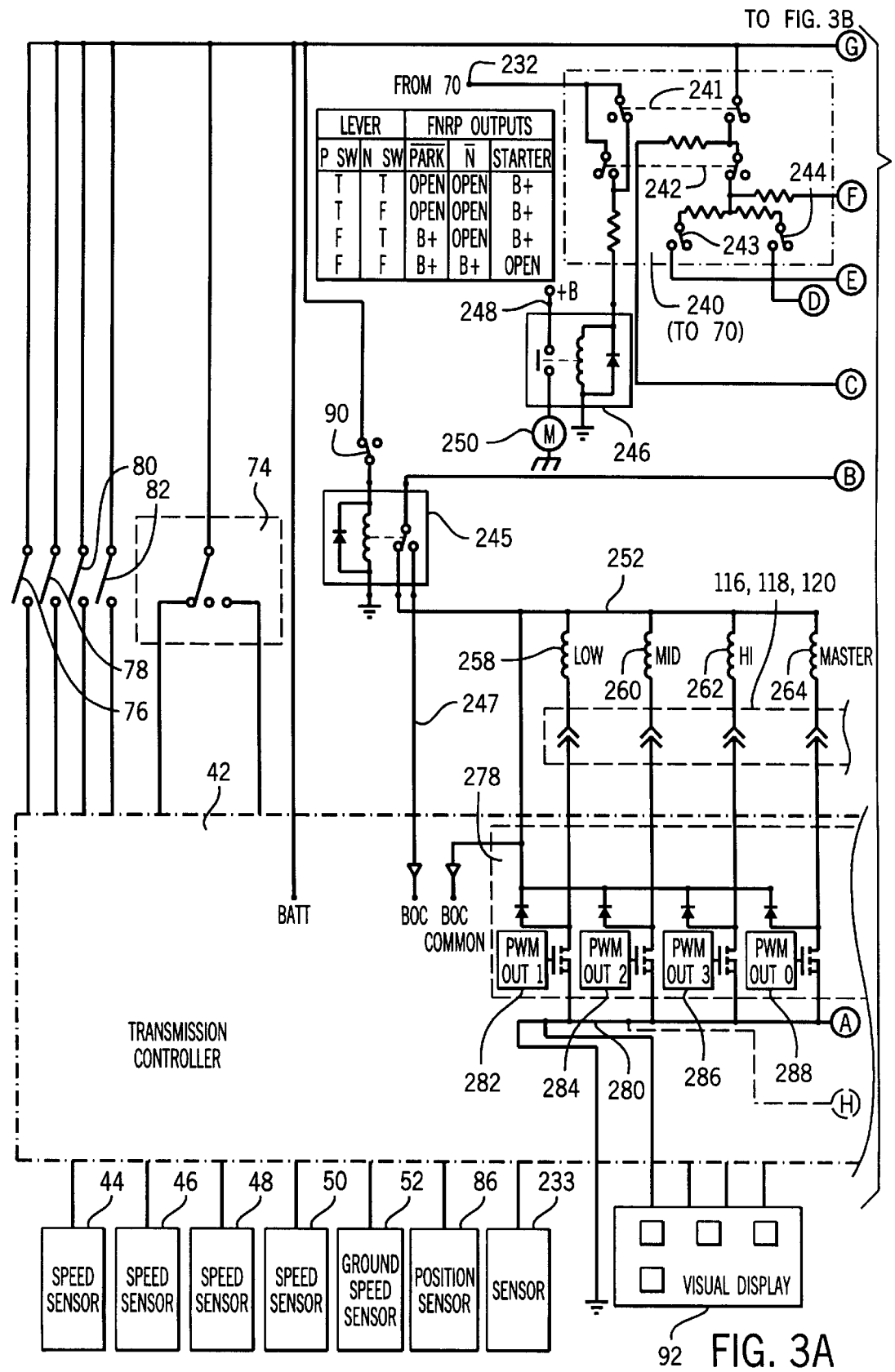
FIGS. 3A and 3B are schematic diagrams of a presently preferred embodiment of the control system.
Figure 3B:
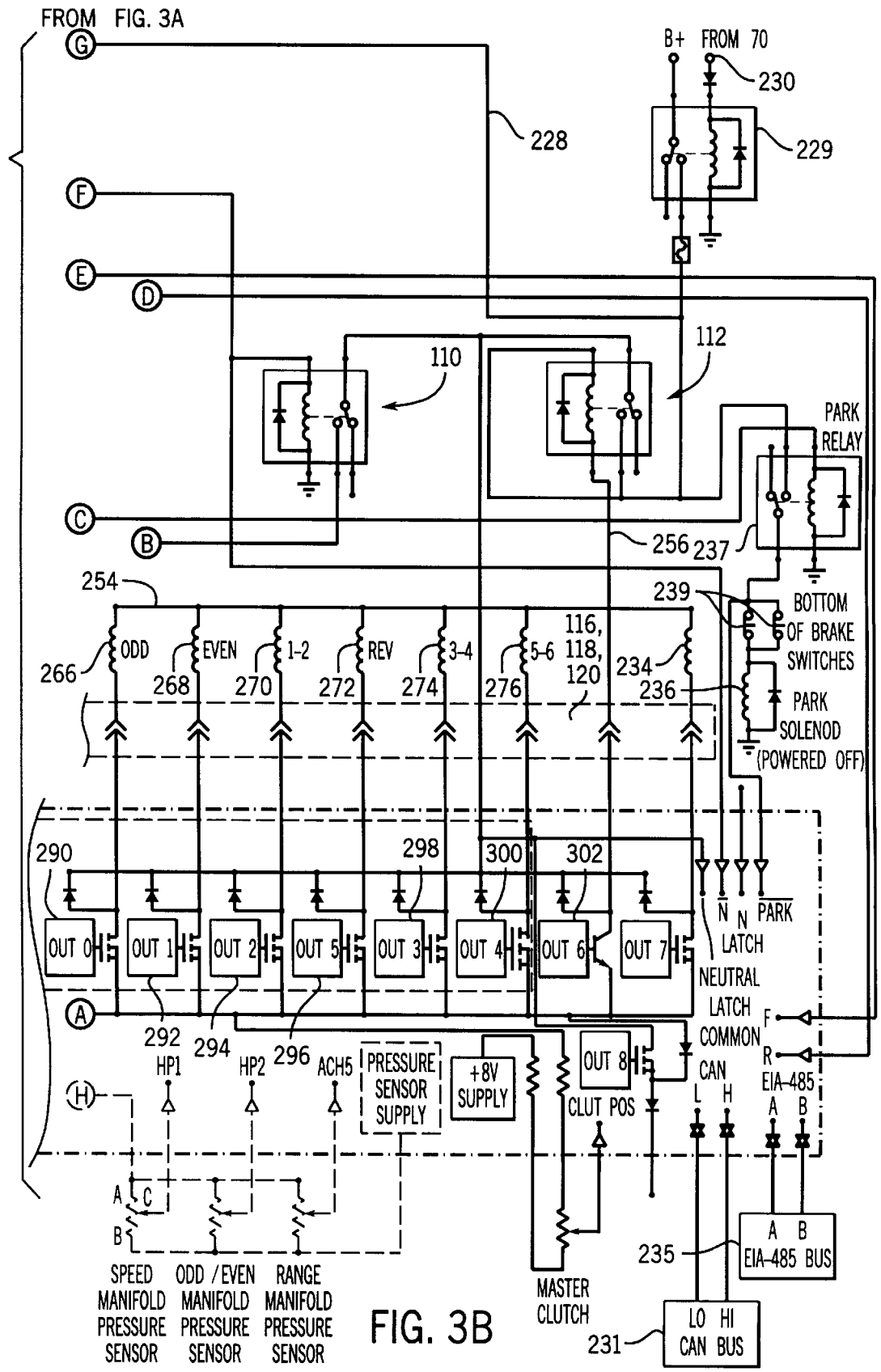
Figure 4:
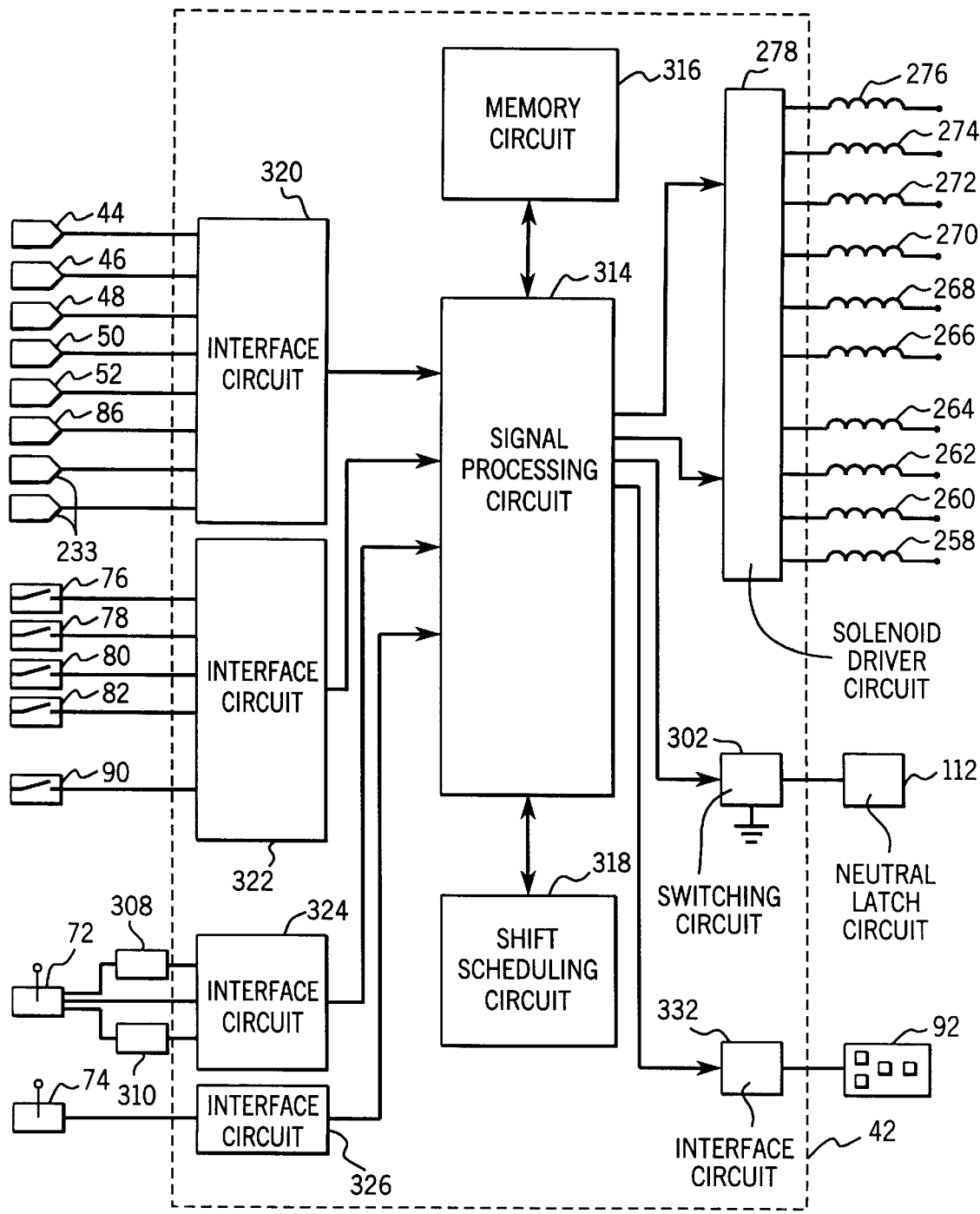
FIG. 4 is a block diagram illustrating certain functional circuitry included in the control system of FIG. 1.

Transmission controller 42 preferably includes a programmed digital microprocessor, memory circuitry and interface and signal conditioning circuitry for receiving input signals from the sensors and command devices discussed above and for applying control signals to directional control valving 126. FIG. 3 illustrates the presently preferred arrangement and interconnection between the various components of control system 38, while FIG. 4 shows flow of certain key signals in the system between functional circuitry included in controller 42.

Turning to FIG. 3, a voltage supply line 228 is selectively coupled to a source of electrical power (i.e. the electrical system of vehicle 10) via a cab power relay 229 controlled by a lead 230 from key switch 70, when switch 70 is placed in a "run" position. Key switch 70 is coupled to a second lead 232 which receives electrical power when key switch 70 is placed in a "start" position. Auto/manual switch 76, diagnostic switch 78, creeper switch 80, and additional switches 82 are coupled between power line 228 and controller 42. When each switch is closed, a corresponding power signal is applied to an input of controller 42. Bump lever 74 is similarly coupled between power line 228 and controller 42, is biased in a center or neutral position in which it applies no signal to controller 42, and is movable to increment and decrement positions in which corresponding increment and decrement signals are applied to controller 42. Sensors 44, 46, 48, 50, 52 and 86 are coupled to inputs of controller 42, whereas display 92 is coupled to outputs of controller 42. Controller 42 may include other inputs for additional sensors 233 such as transmission oil temperature sensors and pressure sensors.

While the sensors and command devices discussed above are shown as dedicated devices in control system 38 coupled directly to controller 42, where vehicle 10 includes similar or redundant devices as part of other on-board control systems, controller 42 may be coupled to a data bus or similar data sharing circuit and obtain signals for control of transmission 14 as required from the data bus. Similarly, signals generated by sensors and command devices included in control system 38 may be shared by other on-board control systems via a data bus. Thus, controller 42 may include interfaces for, e.g., a Controller Area Network (CAN) bus 231 or an EIA-485 bus 235.

Control system 38 includes a creeper solenoid coil 234 coupled to an output of controller 42 for shifting a hydraulic directional control valve in valving 126 for directing pressurized fluid to creeper clutch 136. Control system 38 also includes a park solenoid coil 236 which is energized by power from voltage supply line 228 when a park relay 237 is energized by a park switch 241 and either or both of a pair of bottom of brake switches 239 is closed. An input of controller 42 is coupled to an electrical node between park relay 237 and bottom of brake switches 239 to monitor the voltage applied to park solenoid coil 236. Thus, park solenoid coil 236 is energized directly by park switch 241, which is part of FNRP lever 72.

An FNRP circuit 240 is electrically coupled to power supply line 228 and to lead 232, and is mechanically coupled to FNRP lever 72. FNRP circuit 240 includes a park switch 241, a neutral switch 242, a forward switch 243 and reverse switch 244. Park switch 241 receives power from supply line 228, as does neutral switch 242. Park switch 241 is closed by placing lever 72 in its "park" position. Park switch 241 and neutral switch 242 are, in turn, coupled to a starter relay circuit 246 and to neutral relay circuit 110 (which is, in turn, coupled to neutral latch circuit 112) for preventing vehicle 10 from starting in a condition in which vehicle 10 may inadvertently move due to gear engagement. When FNRP lever 72 is moved into its "neutral" position, neutral switch 242 is closed, while forward and reverse switches 243 and 244 are open. When FNRP lever 72 is then moved to a "forward" or "reverse" position, neutral switch 242 is opened and the corresponding forward or reverse switch 243 or 244 closed.

Starter relay circuit 246 is coupled to a power source, such as the vehicle electrical system, through a lead 248. Lead 248 delivers an energizing signal to the vehicle starter 250, but may do so only when relay circuit 246 closes a connection between lead 248 and starter 250. Relay circuit 246 is powered only when park switch 241 or neutral switch 242 is closed (i.e. when FNRP lever 72 is in its "park" or "neutral" position). Thus, park switch 241, neutral switch 242 and starter relay circuit 246 interrupt power to starter 250 when FNRP lever 72 is in its "forward" or "reverse" positions to prevent starter 250 from being energized through normal means (i.e. by turning key switch 70 to its "start" position) unless transmission 14 is placed in a neutral or parked condition (i.e. disengaged).

Neutral latch circuit 112, neutral relay circuit 110 and a bottom-of-clutch relay circuit 245 provide power to drive directional control valving 126 via power supply lines 252 and 254 as follows. Neutral latch circuit 112 includes a relay coil coupled to controller 42 through a ground connection 256. In normal operation, controller 42 grounds neutral latch circuit 112 to enable its energization and to allow power to flow from supply line 228 to supply line 254. However, controller 42 may interrupt this ground connection to disable or open circuit 112 when desired. In FIG. 3, neutral latch circuit 112 is shown in its disabled or open position, wherein neutral latch circuit 112 permits no power to flow from supply line 228 to supply line 254. Thus, controller 42 can remove power from supply line 254 in response to a detected failure condition (e.g., solenoid short to ground), even when FNRP lever 72 is in neutral. Controller 42 insures that FNRP lever 72 passes through neutral after the key is on before engaging transmission 14.

Neutral relay circuit 110 is coupled between neutral latch circuit 112 and supply line 252. Neutral relay circuit 110 is enabled upon energization of neutral latch relay 112, and itself is energized when either forward switch 243 or reverse switch 244 is closed by moving FNRP lever 72 to its forward or reverse position. When either switch 243 or 244 is thus closed, the coil of relay circuit 110 is energized, drawing the relay closed and providing power to supply line 252. Subsequently, when FNRP lever 72 is moved to its neutral position, opening both forward and reverse switches 243 and 244, power is interrupted to neutral relay circuit 110, causing the relay to open and interrupting power to supply line 252. Neutral relay circuit 110 thus disables transmission 14 by interrupting power to valving 126 when FNRP lever 72 is placed in a neutral position.

Controller 42 is also able to remove power from supply line 252, by opening neutral latch circuit 112, in response to a detected failure condition. Bottom-of-clutch switch 90 and bottom-of-clutch relay circuit 245 are also located in series between neutral relay circuit 110 and supply line 252. When an operator depresses clutch pedal 84 fully to a bottom-of-clutch position, bottom-of-clutch switch 90 shifts from the closed position shown in FIG. 3 to an open position to interrupt power to supply line 252, placing transmission 14 in neutral and applying a bottom-of-clutch signal to controller 42 via a bottom-of-clutch input 247.

As discussed above, each directional control valve included in valving 126 includes a solenoid coil that is energized to shift the corresponding valve, permitting pressurized fluid to flow to a clutch of transmission 14. The solenoid coils for valving 126 are illustrated schematically in FIG. 3. In this embodiment, four such solenoid coils, 258, 260, 262 and 264, are electrically coupled to supply line 252 for engaging low clutch 202, medium clutch 192, high clutch 194, and master clutch 182, respectively. Thus, solenoid coils 258, 260, 262 and 264 depend on bottom-of-clutch switch 90. Six additional coils, 266, 268, 270, 272, 274 and 276 are coupled to supply line 254 for engaging odd clutch 154, even clutch 156, gears 1–2 clutch 170, reverse clutch 178, gears 3–4 clutch 172, and gears 5–6 clutch 174, respectively. Coils 258 through 276 are, in turn, coupled to solenoid driver circuits 278 in controller 42 which selectively couple the coils to a common ground line 280, thereby energizing the coil to shift an associated valve and engage a clutch. In this embodiment, valve drivers 278 include pulse-width-modulated drivers 282, 284, 286 and 288, coupled to coils 258, 260, 262 and 264, respectively. On/off-type drivers 290, 292, 294, 296, 298 and 300, are provided for driving coils 266, 268, 270, 272, 274 and 276, respectively. Presently, only master clutch 182, engaged by coil 264 through pulse-width-modulated driver 288, is engaged and disengaged by modulation. Other pulse-width-modulated drivers 282, 284 and 286 either fully energize or fully de-energize their associated valve coils. However, the provision of these pulse-width-modulated drivers is preferred to permit future adaptation of controller 42 for additional clutch modulation tasks. These groupings of solenoid valves prevent the clutches in the range transmission from being disconnected during a shuttle shift (which opens the neutral relay).

In addition to valve drivers 278, controller 42 includes an additional switching circuit 302 coupled to ground connection 256 from neutral latch circuit 112. Switching circuit 302 is electrically coupled to common ground line 280 and permits controller 42 to selectively open neutral latch circuit 112, thereby interrupting power to supply lines 252 and 254, disabling valve coils 258 through 276 and placing transmission 14 in neutral. In normal operation, however, controller 42 maintains circuit 302 closed, thereby grounding connection 256.

Valve coils 266, 268, 270, 272, 274 and 276 are coupled to power supply line 254, which receives electric power when key switch 70 is in run position, energized even when vehicle 10 is in neutral or park. Thus, controller 42 may energize coils 266, 268, 270, 272, 274 and 276 to engage clutches 154, 156, 170, 178, 172 and 174 although the remainder of the valve solenoids are disabled. Presently, controller 42 engages clutches 172 and 174 when FNRP lever 72 is placed in its "neutral" or "park" position for more than 0.1 second, thereby locking intermediate transmission shaft 162 against rotation. Locking shaft 162 against rotation effectively defeats hydraulic drag within transmission 14 that might otherwise tend to transmit some torque through the transmission to one or more output shaft. The time delay in locking shaft 162 permits the vehicle operator to traverse the "neutral" and "park" positions quickly without engaging clutches 172 and 174. In addition, transmission 14 includes a spring applied parking brake (not shown), spring biased into an engaged position wherein it blocks rotation of at least output shaft 58. During normal (i.e. non-parked) operation of transmission 14, the parking brake is held in a non-engaged position by energizing park solenoid coil 236 via an appropriate control signal from controller 42. When FNRP lever 72 is placed in its "park" position, however, controller 42 de-energizes coil 236, thereby releasing the parking brake and preventing rotation of the transmission output shaft.

Park switch 241, valve coils 258 through 276, and ground connection 256 are coupled to controller 42 through harness connectors 116 and 118. The connections shown in FIG. 3 represent those present when connectors 116 and 118 are mated, as for normal operation of transmission 14. Upon the occurrence of certain system failures, such as failure of controller 42, control system 38 may be placed in a "limp home" configuration by uncoupling connector 116 from connector 118 and mating connector 118 with limp home connector 120 in a manner generally known in the art. The "limp home" configuration may be that disclosed in U.S. Pat. No. 5,611,245, incorporated herein by reference, also assigned to Case Corp.

As shown in FIGS. 3 and 4, signals from sensors 44, 46, 48, 50, 52, 86 and 233, and from switches 76, 78, 80, 82 and 90 are applied to controller 42 via their respective communication links. Similarly, the states of FNRP lever 72 and bump lever 74 are communicated to controller 42. In the present embodiment, controller 42 is a microprocessor-based digital controller including a signal processing circuit 314, typically configured through appropriate coding of a microprocessor, such as an Intel 80C198 or Intel 80C196 microcontroller. Controller 42 further includes appropriate memory circuitry 316, which preferably includes electronically erasable programmable read only memory (EEPROM) and random access and read only memory (RAM and ROM) for storing a preset, cyclic transmission control routine implemented by signal processing circuit 314, calibration values for the various clutches and other calibrated components of control system 38, as well as various temporarily stored values used by controller 42, such as command values, sensed values and the like. A shift scheduling circuit 318, illustrated in FIG. 4 as separate from signal processing circuit 314 and memory circuit 316, but typically configured via coding within the microprocessor, functions with signal processing circuit 314 to schedule shifts into and out of gear ratios based upon the control routine executed by signal processing circuit 314.

Signal processing circuit 314 preferably includes an on-board analog-to-digital converter (not shown in FIG. 4) for converting input parameter signals directly to digital signals for processing. However, controller 42 will typically include interface circuits 320, 322, 324 and 326 for converting and conditioning the sensed and command signals produced by the system sensors and command devices into filtered signals and for isolating signal processing circuit 314 from power surges and the like. Moreover, controller 42 includes valve driver circuits 278, discussed above, for converting control signals output by signal processing circuit 314 into drive signals for energizing valve coils 258 through 276. Neutral latch circuit 112 is also coupled to signal processing circuit 314, which monitors the state of circuit 112 and controls grounding of circuit 112 via driver 302. Display 92 is coupled to signal processing circuit 314 through an interface circuit 332. The particular configuration of interface circuits 320, 322, 324, 326 and 332 will vary depending upon the particular sensors, command devices and signal processing circuitry employed in the system.

In operation, sensors 44 through 52, 86 and 233 continuously apply sensed parameter signals to interface circuit 320, which filters and converts these signals to a range and form usable by signal processing circuit 314. Similarly, command devices 72 through 82 and 90 apply signals to signal processing circuit 314 via their respective interface circuits 324 and 326, signal processing circuit 314 typically accessing the various command signals periodically as required by the transmission control routine stored in memory circuit 316. When automatic/manual switch 76 is placed in its "manual" position, transmission 14 may be shifted upon direct command from the vehicle operator by manipulation of clutch pedal 84 and levers 72 and 74. However, when switch 76 is placed in "automatic", however, signal processing circuit 314 cycles through the transmission control routine accessed from memory circuit 316 and, based upon the input and command signals applied by the sensors and command devices, determines when and how transmission 14 is to be shifted between the gear ratios described above, as well as when portions of control system 38 should be disabled, such as by interrupting the ground to neutral latch circuit 112. Memory circuit 316 stores as part of the control routine, a table of gear ratios available through particular combinations of transmission clutches as described above. Shifts selected by signal processing circuit 314 are based upon these preset combinations. The overall transmission control routine may include various subroutines for controlling transmission operation in specific situations. Generally, however, the overall control routine permits modulated shifting, including shuttle shifting and power shifting, which are techniques well known in the art, along with skip shifting as described below.

Signal processing circuit 314 cooperates with shift scheduling circuit 318 to schedule the shifts (i.e. engagement and disengagement of combinations of clutches) identified by signal processing circuit 314. As mentioned above, in the presently preferred embodiment, signal processing circuit 314 and shift scheduling circuit 318 are configured in a programmed microprocessor, shift scheduling circuit 318 effectively being an aspect or subroutine of the overall control routine, adapted to schedule disengagement of "outgoing" clutches and engagement of "in-coming" clutches to obtain smooth transitions between gear ratios. Based upon this scheduling, signal processing circuit 314 generates appropriate control signals to energize and de-energize coils 258 through 276, and applies these control signals to the coils through driver circuits 278 to execute the selected shifts.

In normal operation, the operator configures control system 38 for automatic or manual operation by manipulating automatic/manual switch 76. The operator may then preselect forward and reverse commanded gear ratios, as described below, which are then both displayed on display 92. Controller 42 will then schedule shifts to obtain the commanded gear ratio upon FNRP lever 72 being moved to either its "forward" or "reverse" position. Such shifting will typically be accomplished through the use of skip shifting, shuttle shifting and power shifting techniques. During steady state operation of vehicle 10 in either the forward or the reverse direction, the preselected gear ratios indicated on display 92 will generally be engaged as the commanded gear ratio, unless changed by the operator. The operator may then increment or decrement the commanded gear ratio by moving bump lever 74 to its "increment" or "decrement" position. Bump lever 74 may be held in either position to increment or decrement the commanded gear ratio through more than one ratio. Bump lever 74 is released once the desired commanded gear ratio is reached. Bump lever 74 thus increments or decrements the gear ratio in the direction then currently selected via FNRP lever 72 (i.e., forward or reverse). As the forward and reverse gear ratios are incremented or decremented, these changes are indicated on display 92 and forward and reverse gear ratios stored in memory circuit 316 are updated as described below. In response to such increments and decrements, controller 42 schedules and executes shifts to the desired gear ratio.

Figure 5:
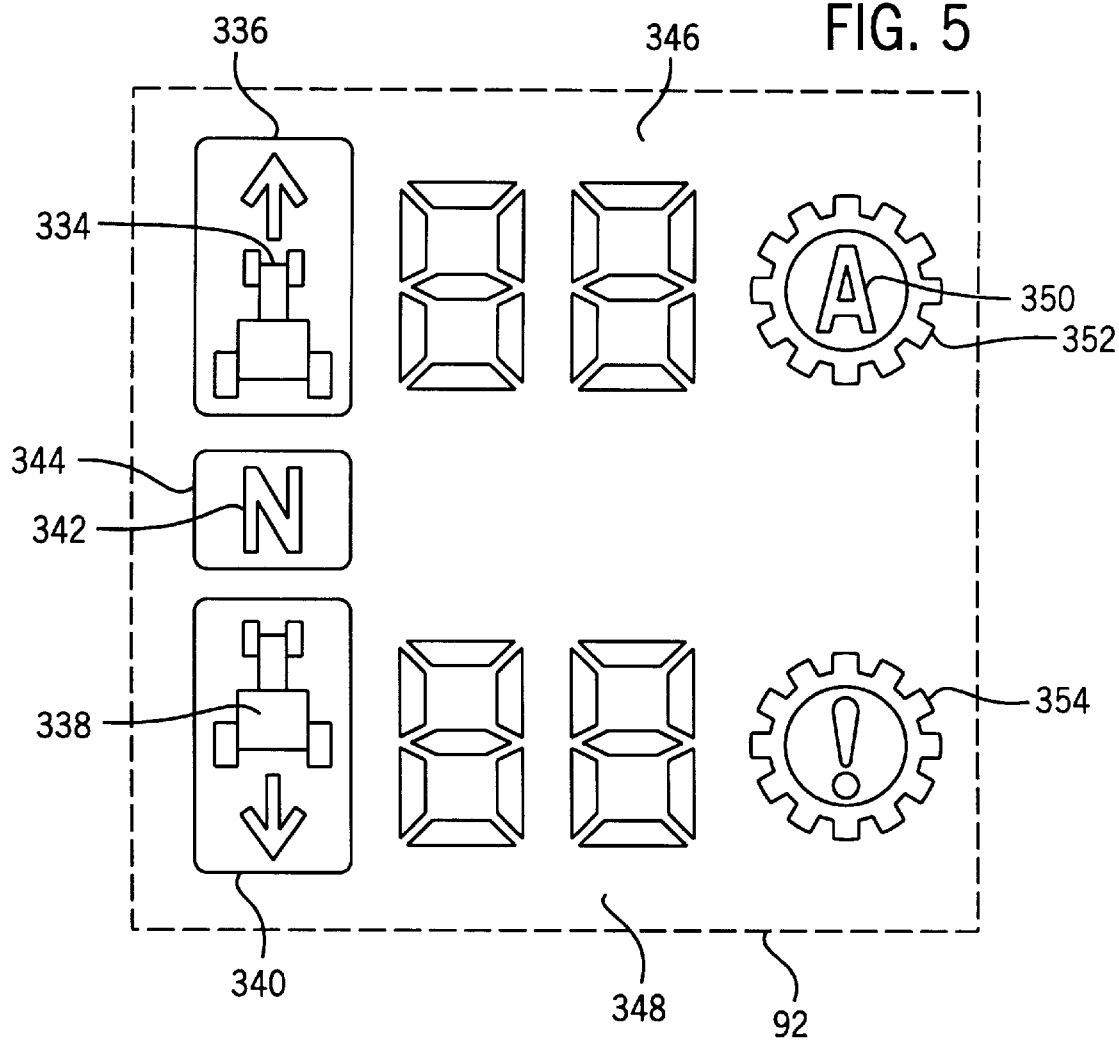
FIG. 5 illustrates a portion of a control panel display in accordance with the presently preferred embodiment, indicating information available to the vehicle operator during operation of the control system.

In addition to applying control signals to coils to engage and disengage transmission clutches, signal processing circuit 314 outputs signals to display 92 to provide the vehicle operator with information on the operation of transmission 14 and controller 42. As shown in FIG. 5, display 92 includes a series of icons for conveying information to the operator. These icons include a forward icon 334, a forward box 336, a reverse icon 338 and reverse box 340, and a neutral icon 342 and neutral box 344. Display 92 also includes forward digits 346 and reverse digits 348, an automatic icon 350 surrounded by a transmission icon 352 and a diagnostics icon 354. The forward, reverse, neutral and transmission icons, 334, 338, 342 and 352, respectively, are continuously visible after vehicle 10 is powered up. When FNRP lever 72 is placed in its "forward," "reverse" or "neutral" position, thereby closing forward, reverse or neutral switches, 243, 244 or 242, respectively, the corresponding box icon 336, 338 or 344 is illuminated, indicating the then current state of transmission 14. As described above, control system 38 places transmission 14 in a neutral condition upon start up, resulting in illumination of neutral box 344 until forward or reverse gear engagement. When automatic/manual switch 76 is placed in its "automatic" position, permitting controller 42 to control engagement and disengagement of transmission 14 in accordance with the particular routine stored in memory circuit 316, automatic icon 350 is illuminated. In normal operation, forward and reverse digits 346 and 348 display preselected gear ratios in the forward and reverse directions. These preselected gear ratios are effectively the commanded forward and reverse gear ratios into which transmission 14 will be shifted by controller 42 upon movement of FNRP lever 72 to its "forward" or reverse" positions, and may be modified by actuation of bump lever 74 as described above. However, digit displays 346 and 348 preferably permit additional information to be conveyed to the operator. For example, when FNRP lever 72 is placed in its "park" position, digit display 348 indicates the letter "P." In one embodiment, digit displays 346 and 348 could be used to convey error messages for system diagnostics. When controller 42 determines that a fault condition is present in system 38, diagnostic icon 354 becomes visible. Such fault conditions may include, for example, failure of a solenoid coil or valve driver, a difference between a detected clutch pressure and state of a solenoid coil, open circuits and the like. Also, controller 42 preferably includes a diagnostics routine, of a type generally known in the art, that permits error codes indicative of such failures to be accessed from memory circuit 316. Such error codes may be conveniently displayed in two-digit code form on digit displays 346 and 348, or could instead be displayed on another display on vehicle 10 (e.g., on a reconfigurable display of the vehicle's instrument cluster unit).

Figure 6:
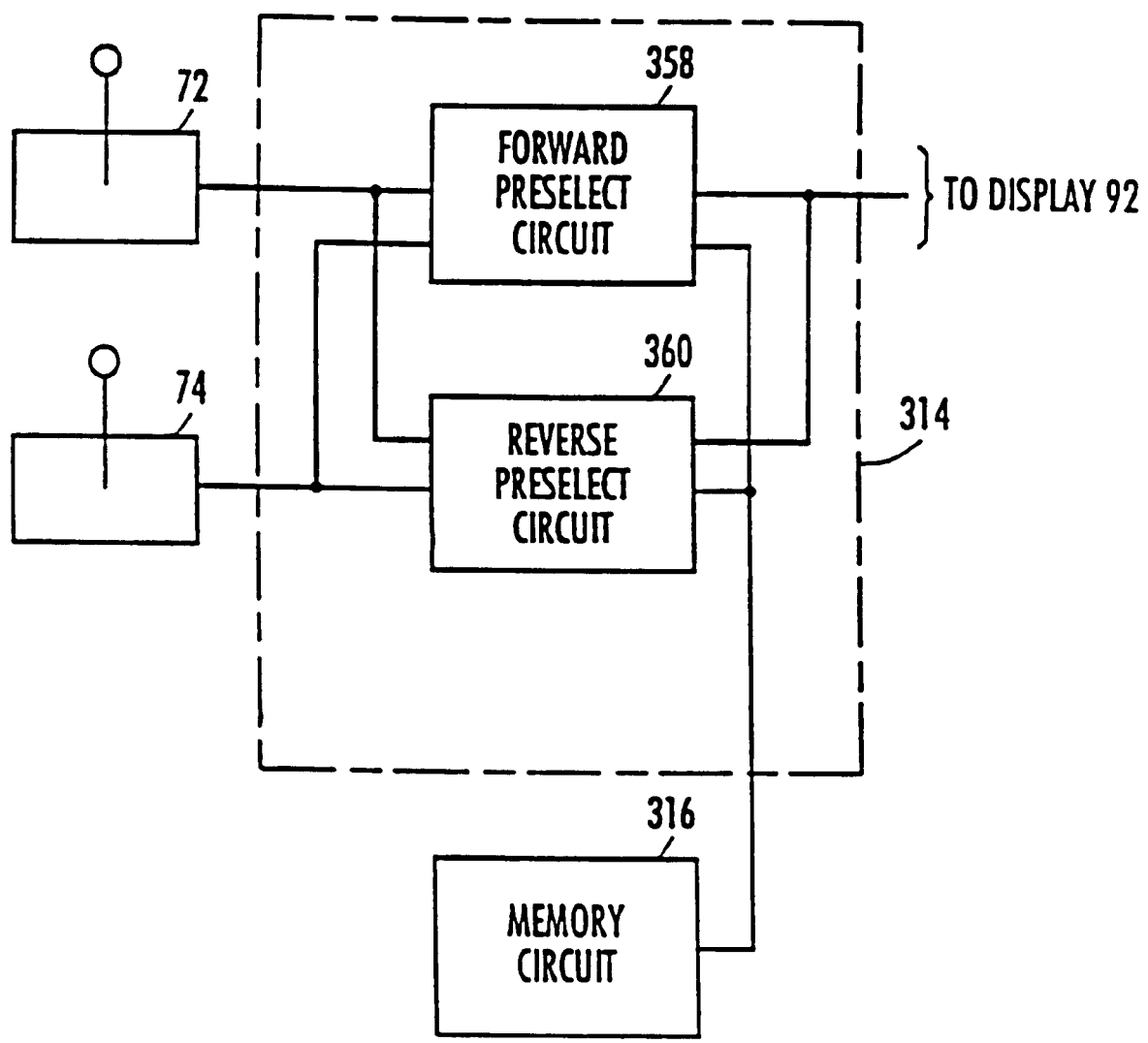
FIG. 6 is a signal flow diagram generally illustrating the flow of signals processed by the control circuit of the system shown in FIG. 4 for preselecting forward and reverse gear ratios.

FIG. 6 illustrates certain of the functional circuitry included in signal processing circuit 314 for permitting the operator to preselect forward and reverse gear ratios. This functional circuitry includes a forward preselect circuit 358 and a reverse preselect circuit 360. As mentioned above with respect to signal processing circuit 314, forward preselect circuit 358 and reverse preselect circuit 360 are preferably configured through appropriate programming of a digital microprocessor, and will typically constitute part of a larger transmission control routine. Forward and reverse preselect circuits 358 and 360 receive inputs from FNRP lever 72 and bump lever 74. Both circuits 358 and 360 are coupled to memory circuit 316 for accessing the current preselected gear ratio values and storing reset values as described below. Moreover, both circuits 358 and 360 are coupled to display circuit 92 for displaying indicia (e.g. digital arrays) representing the preselected gear ratio values stored in memory circuit 316.

Figure 7A:
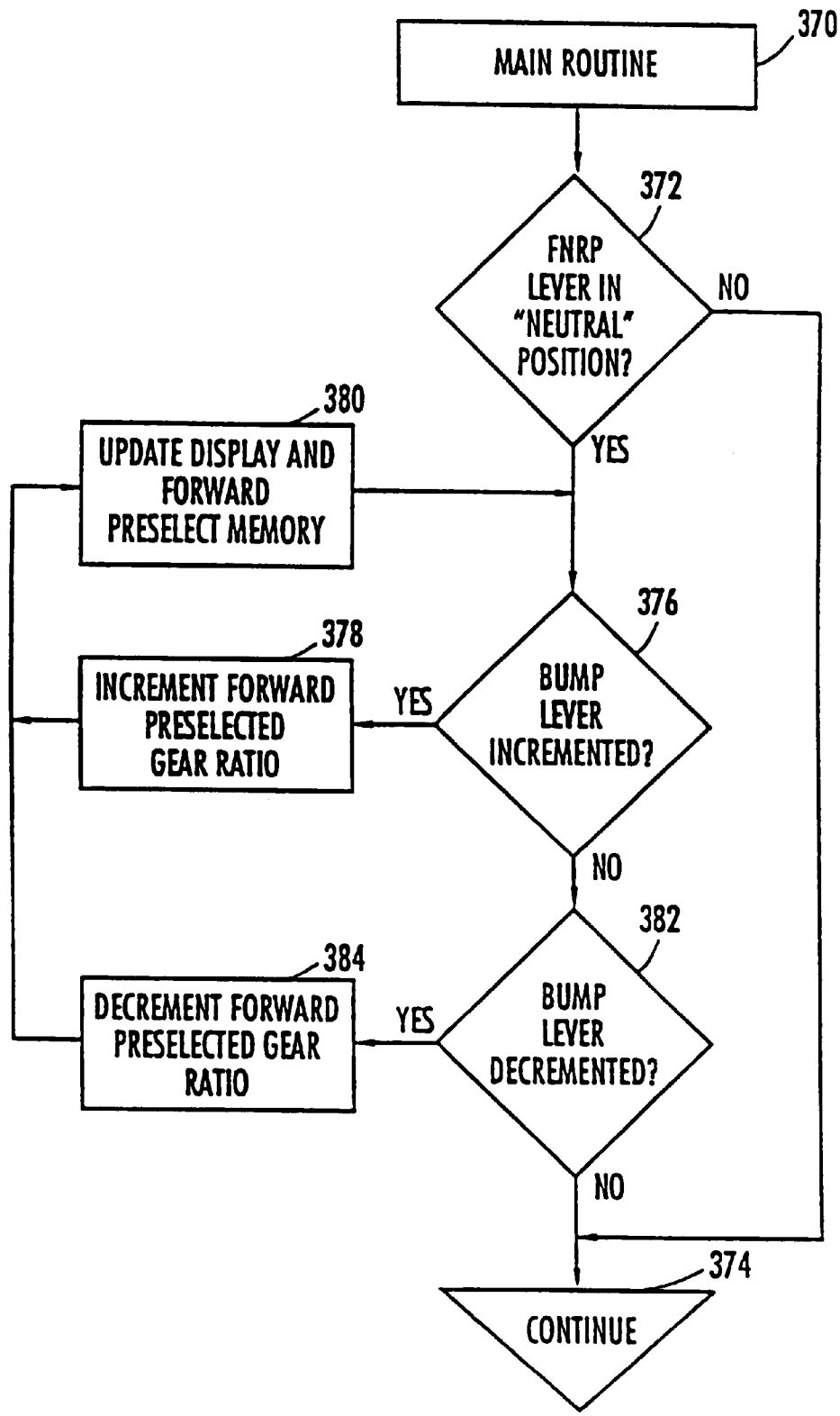
FIGS. 7A and 7B are flow charts depicting the exemplary steps in control logic implemented by the control system of FIGS. 4 and 6 in preselecting forward and reverse gear ratios.
Figure 7B:
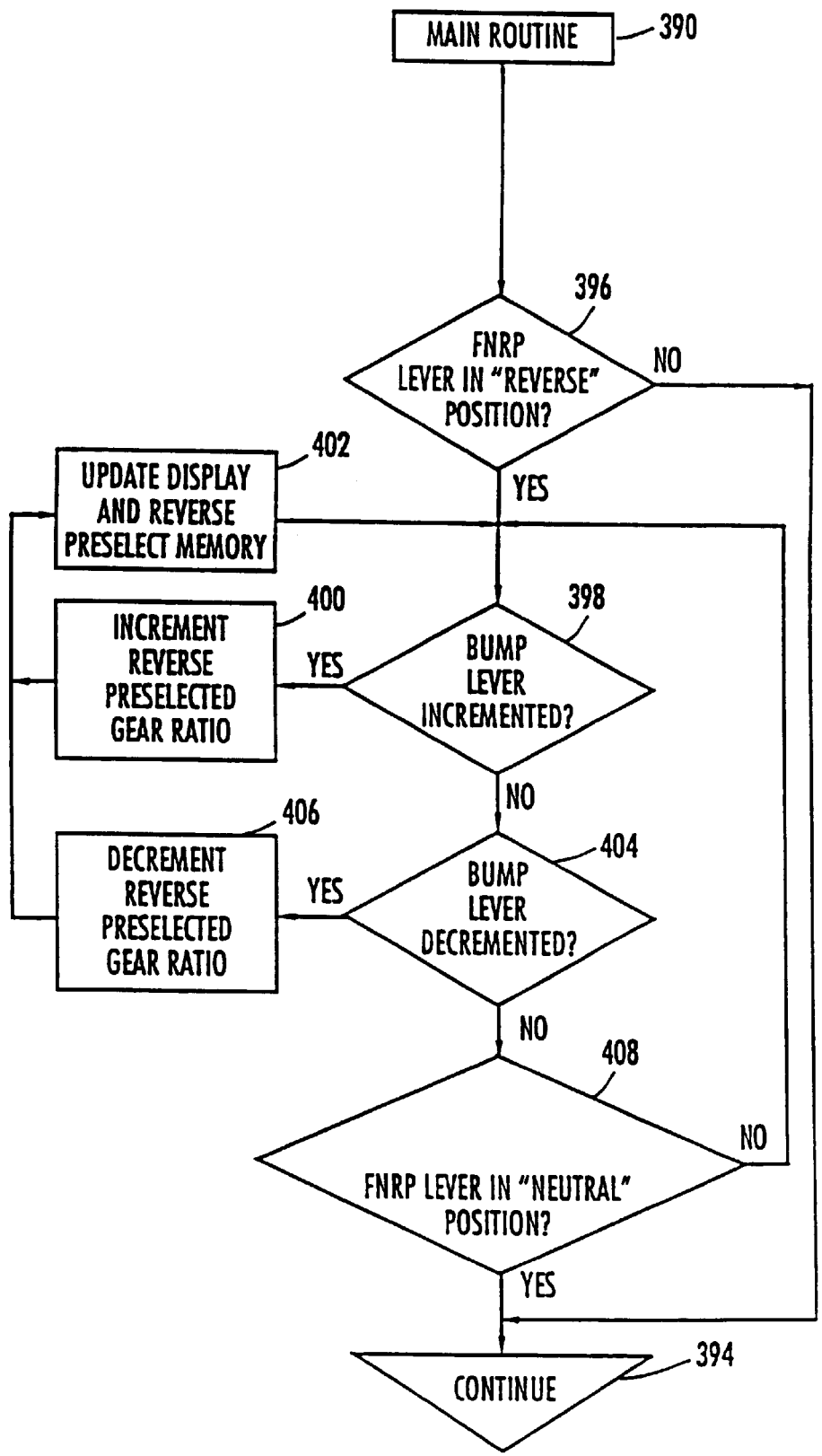

FIGS. 7A and 7B illustrate exemplary steps in control logic for preselecting forward and reverse gear ratios. The preselection routines generally permit the operator to configure controller 42 with transmission 14 in neutral. The values selected and stored during the routine are displayed on display 92 and stored in memory circuit 316. These preselected values are used as target or command gear ratios to which the transmission is shifted by manipulation of FNRP lever 72. When transmission 14 is engaged in a forward or reverse gear ratio, the operator may alter the commanded gear ratio by moving bump lever 74 to its "increment" or "decrement" position as described above. Such "on the fly" changes cause signal processing circuit 314 to replace the forward and reverse preselected gear ratios with the new command values, and to display the new command values on gear display 92. Thus, the operator may alter the preselected or command gear ratios in both the forward and reverse directions and keep abreast of the current, stored forward and reverse gear ratio values via display 92.

As shown by block 370, controller 42 cycles through the main transmission control routine stored in memory circuit 316, in which signal processing circuit 314 acts upon input signals for shifting transmission 14 into desired gear ratios as described above. In particular, controller 42 cyclically checks the status of the various inputs and enters subroutines or similar logical processes based upon these inputs. At step 372, as part of this main control routine, signal processing circuit 314 cyclically monitors the status of FNRP lever 72. If FNRP lever 72 is not moved to its "neutral" position, signal processing circuit 314 advances to step 374, continuing with the main transmission control routine. However, if at step 372 signal processing circuit 314 determines that FNRP lever 72 is in its "neutral" position, circuit 314 advances to step 376 and, eventually to step 382 wherein the forward preselected gear ratio may be reset. Memory circuit 316 preferably stores default forward and reverse gear ratios that serve as the preselected ratios upon power up of vehicle 10, and continue as the preselected ratios until reset as described below. In one embodiment, these default preselected gear ratios are the 6$^{th}$ forward gear ratio and the 3$^{rd}$ reverse gear ratio.

At step 376, signal processing circuit 314 monitors the state of bump lever 74 to determine if it is moved to its "increment" position. If so, forward preselect circuit 358 increments the forward preselected gear ratio by adding one to the current forward ratio value stored in memory circuit 316, at step 378, and proceeds to step 380 where the incremented value is displayed on display 92 and the reset value of the forward preselected gear ratio is stored in memory circuit 316. From step 380, signal processing circuit 314 returns to step 376 and, if lever 74 is maintained in its "increment" position, continues to increment the forward preselected gear ratio and update display 92 by cycling through steps 378 and 380. Such incrementing may be continue until the highest forward gear ratio is reached.

When either the highest forward gear ratio is reached or bump lever 74 is moved out of its "increment" position, signal processing circuit 314 advances to step 382, where the state of bump lever 74 is monitored to determine if it is moved to its "decrement" position. If lever 74 is moved to its "decrement" position, forward preselect circuit decrements the forward preselected gear ratio by subtracting one from the current forward ratio value in memory circuit 316, as indicated at step 384. At step 380, display circuit 92 is updated to indicate this change and the reset forward preselected gear ratio value is stored in memory circuit 316. As described above for the incrementing procedure, decrementing of the forward preselected gear ratio may continue for as long as bump lever 74 is held in its "decrement" position, or until the lowest forward gear ratio is reached.

As long as signal processing circuit 314 determines that bump lever 74 is not moved to its "increment" or "decrement" positions at steps 376 and 382, the value of the forward preselected gear ratio stored in memory circuit 314 remains unchanged, and circuit 314 advances through steps 376 and 382 to step 374. Using the forward preselected gear ratio value stored in memory circuit 314, controller 42 schedules and executes shifting of transmission 14 to the preselected forward gear ratio when FNRP lever 72 is moved from its "neutral" to its "forward" position, utilizing modulating and skip shifting techniques, particularly for higher gear ratios.

As shown in FIG. 7B, reverse gear ratio preselection is as follows. As described above, signal processing circuit 314 cycles through a main transmission control routine at step 390 and then advances to step 396 where the state of FNRP lever 72 is monitored. If, at step 396, FNRP lever 72 is found to be in its "reverse" position, reverse preselect circuit 360 is invoked and advances to the reverse preselection routine described below. If, conversely, at step 396 lever 72 is found not to be in its "reverse" position, signal processing circuit 314 again advances to step 394 and carries on with the main control routine.

Once signal processing circuit 314 has determined that FNRP lever 72 is in its "reverse" position, reverse preselect circuit 360 monitors the state of bump lever 74, at steps 398 and 404. If, at step 398, bump lever 74 is found to be in its "increment" position, circuit 314 increments the reverse preselect gear ratio by adding one to the reverse gear ratio stored in memory circuit 316, as indicated at step 400. At step 402, display 92 is updated to show this new value for the reverse preselected gear ratio, and the new value is stored in memory circuit 316. This incrementing procedure continues by cycling through steps 398, 400 and 402 so long as bump lever 74 is held in its "increment" position, or until the largest reverse gear ratio is reached.

When either of these events occurs, signal processing circuit 314 advances to step 404 where the state of bump lever 74 is monitored to determine if it has been moved to its "decrement" position. If lever 74 is moved to its decrement position, circuit 314 advances to step 406 where the reverse preselected gear ratio stored in memory circuit 316 is decremented. Display 92 is then updated to reflect this decremented value and the new value is stored in memory circuit 316, as indicated at step 402. Such decrementing may continue so long as lever 74 is held in its "decrement" position, or until the lowest reverse gear ratio is reached.

At step 408, signal processing circuit 314 exits the reverse gear ratio preselection routine when FNRP lever 72 is moved to its "neutral" position. So long as FNRP lever 72 is in its "reverse" position, signal processing circuit 314 will respond to movement of bump lever 74 as a command to increment or decrement the reverse preselected gear ratio. Upon exiting the reverse preselection routine at step 408, controller 42 continues the main control routine, as indicated at step 394, and will schedule shifts to the reverse preselected gear ratio stored in memory circuit 316 whenever FNRP lever 72 is moved to its "reverse" position.

During operation, the operator can bottom clutch pedal 84 when preselecting the reverse gear to prevent transmission 14 from actually going into reverse. Thus, the process of preselecting the reverse gear operates independently of the state of bottom-of-clutch switch 90. The transmission itself is controlled by an operate transmission process which monitors FNRP lever 72, bottom-of-clutch switch 90, the position of clutch pedal 84 (using position sensor 86), along with other control input signals, and engages the transmission valves based thereon.

As noted above, the forward and reverse preselected gear ratios set by the foregoing procedures continue to be displayed on display 92 throughout normal operation of vehicle 10, unless altered by actuation of bump lever 74. The operator is thus provided with an indication of both the forward and reverse gear ratios to which transmission 14 will be shifted when FNRP lever 72 is moved from its "neutral" position to either its "forward" or "reverse" position, or when FNRP lever 72 is moved from its "forward" position to its "reverse" position, or vice versa, such as for shuttle shifting between forward and reverse gear ratios in a manner generally known in the art. Once engaged in a forward or reverse gear ratio, however, the operator may use bump lever 74 to upshift or downshift transmission 14, and signal processing circuit 314 then updates the corresponding forward or reverse gear ratio value stored in memory circuit 316 as well as display 92 to reflect the change. It should also be noted that the foregoing procedures permit the vehicle operator to preselect forward and reverse gear ratios completely independently of one another, and to reset the preselected gear ratios in either direction without affecting the preselected ratio in the opposite direction.

In one embodiment, control system 38 provides for automatic and variable skip shifting of transmission 14 under certain conditions. As described above, skip shifting refers to the ability of transmission 14 to skip certain intermediate gear ratios between the current transmission gear ratio and a desired gear ratio. By skipping these intermediate gear ratios, control system 38 provides the capability to shift to the desired gear ratio in less time than in a comparable control system not equipped with skip shifting capability, thereby improving vehicle operation by improving vehicle acceleration and deceleration. Before the specific operation of the skip shifting performed by control system 38 is described below, the following paragraphs first describe other shifting operations performed by control system 38, such as forward and reverse engagement, upshifting and downshifting, and shuttle shifting. These other shifting operations use the skip shifting capability under certain conditions when controller 42 executes the transmission control routine stored in memory circuit 316.

Forward and reverse engagement of transmission 14 operate as follows. As discussed above, FNRP lever 72 allows the operator to selectively command controller 42 to shift the transmission 14 into various forward, reverse and neutral gear ratios for driving vehicle 10 in a desired direction at desired speeds. Moving FNRP lever 72 from "neutral" or "park" to "forward" commands controller 42 to shift transmission 14 to the selected forward gear ratio shown on forward gear display 346. The valve of master clutch 182 is modulated on at a fixed predefined rate. When the commanded gear ratio is less than or equal to a predetermined maximum forward shuttle gear ratio (e.g., $13^{th}$ gear ratio), the commanded gear ratio is directly engaged via appropriate clutch actuation. Otherwise, if the commanded gear ratio is above this predetermined gear ratio, controller 42 directly engages this predetermined gear ratio and then begins to skip upshift towards the commanded gear ratio provided that engine speed remains above a minimum upshift speed (e.g., 700 rpm) to prevent the engine from stalling. For example, if the predetermined gear ratio is the $13^{th}$ forward gear ratio and FNRP lever 72 is shifted from the "neutral" to the "forward" position with the selected forward gear ratio being the $8^{th}$ gear ratio, controller 42 directly engages the $8^{th}$ gear ratio. However, if FNRP lever 72 is shifted from "neutral" to "forward" with the selected forward gear ratio being the $17^{th}$ gear ratio, controller 42 directly engages the $13^{th}$ gear ratio, and then begins to skip upshift to the $17^{th}$ gear ratio.

Similarly, moving FNRP lever 72 from "neutral" or "park" position to the "reverse" position commands controller 42 to shift transmission 14 to the selected reverse gear ratio shown on reverse gear display 348. The valve of master clutch 182 is modulated on at a fixed predefined rate. When the commanded gear ratio is below a predetermined maximum reverse shuttle gear ratio, the commanded gear ratio is directly engaged through appropriate clutch actuations. Otherwise, if the commanded gear ratio is above this predetermined gear ratio, controller 42 directly engages the predetermined gear ratio and resets the commanded gear ratio to this predetermined gear ratio. No skip shifting is performed in reverse, and the transmission shifts through each gear ratio at a predetermined manual shift period (e.g., 0.5 sec) per shift to reach the commanded gear ratio. This predetermined gear ratio is the $3^{rd}$ reverse gear ratio. Thus, for example, when FNRP lever 72 is shifted from "neutral" to the "reverse" position with the selected reverse gear ratio being the $2^{nd}$ gear ratio, controller 42 directly engages the $2^{nd}$ gear ratio. However, if lever 72 is shifted from "neutral" to the "reverse" position with the selected reverse gear ratio being the $4^{th}$ gear ratio, controller 42 directly engages the $3^{rd}$ gear ratio, and then resets the commanded gear ratio to the $3^{rd}$ gear ratio.

Upshifting and downshifting operations are as follows. As described above, bump lever (or switch) 74 allows the operator to increment or decrement the selected gear ratio of transmission 14. Pressing and releasing bump lever 74 to the increment or upshift position for less than or equal to a predetermined slow bump time period (e.g., 1.0 second) causes the commanded gear ratio to increment by one. Holding lever 74 in the increment position causes the commanded gear ratio to be incremented once for each predetermined fast bump time period (e.g., 1.0 second) that elapses until lever 74 is released. As the commanded gear ratio is incremented, controller 42 upshifts transmission 14 to the commanded gear ratio, either by upshifting sequentially through each intermediate gear ratio or, as described below, by skip upshifting. To prevent the engine from stalling, controller 42 does not upshift when the engine speed falls below a minimum upshift speed (e.g., 700 rpm). If the engine speed recovers within an upshift speed timeout period (e.g., 5 seconds), upshifting continues. Otherwise, the commanded gear ratio is reset to the current gear ratio and upshifting ceases.

Similarly, pressing and releasing bump lever 74 to the decrement or downshift position for less than or equal to the slow bump time period causes the commanded gear ratio to decrement by one. Holding lever 74 in the decrement position causes the commanded gear ratio to be decremented once for each predetermined fast bump time period that elapses until lever 74 is released. As the commanded gear ratio is decremented, transmission 14 is downshifted to the commanded gear ratio, either by downshifting sequentially through each intermediate gear ratio or, as described below, by skip downshifting. To prevent the engine from overspeeding, controller 42 does not downshift transmission 14 if the engine speed rises above a predetermined maximum downshift speed (e.g., 2420 rpm). When the engine speed recovers, downshifting is allowed to continue. However, if lever 74 is held in the downshift position, the predetermined maximum downshift speed is increased (e.g., to 2800 rpm) until lever 74 is released in order to provide for additional engine braking of vehicle 10.

Forward and reverse shuttle shifting operations are as follows. Moving FNRP lever 72 from "reverse" to "forward" position commands controller 42 to shift transmission 14 to the selected forward gear ratio shown on forward gear display 346. Controller 42 first places transmission 14 into neutral for a predetermined dump time (e.g., 0.5 seconds) to ensure that master clutch 182 is fully released before being modulated back up. The valve of master clutch 182 is modulated on at the fixed predefined rate. When the commanded gear ratio is less than or equal to the predetermined maximum forward shuttle gear (e.g., $13^{th}$ gear), the commanded gear ratio is directly engaged via appropriate clutch actuation. Otherwise, if the commanded forward gear ratio is above this predetermined gear ratio, controller 42 directly engages this gear ratio and then begins to skip upshift towards the commanded gear ratio provided the engine speed remains above the minimum upshift speed (e.g., 700 rpm).

Similarly, moving FNRP lever 72 from the "forward" to "reverse" position commands controller 42 to shift transmission 14 to the selected reverse gear ratio shown on reverse gear display 348. Controller 42 first places transmission 14 into neutral for the predetermined dump time to ensure master clutch 182 is fully released before being modulated back up. The valve of master clutch 182 is modulated on at the fixed predefined rate. When the commanded gear ratio is below the predetermined maximum reverse shuttle gear ratio, the commanded gear ratio is directly engaged via appropriate clutch actuations. Otherwise, if the commanded gear ratio is above this predetermined gear ratio, controller 42 directly engages this predetermined gear ratio and resets the commanded gear ratio to this predetermined gear ratio. No skip shifting is performed in reverse, and the transmission shifts through each gear ratio at the predetermined manual shift period per shift to reach the commanded gear ratio.

During shuttle shifting, when FNRP lever 72 has left the forward or reverse position but has not yet reached the reverse or forward position, respectively, the transmission is put into a state similar to "neutral" with the speed and master clutch valves turned off. If FNRP lever 72 remains in this state for more than a maximum unlocked time (e.g., 2 sec), the transmission is placed in neutral until lever 72 is returned to the "neutral" or "park" position.

Control system 38, then, is able to skip upshift during forward engagement operations, to skip upshift and skip downshift during forward upshifting and downshifting operations, respectively, and to skip upshift during forward shuttle shifting operations. In the present embodiment, however, no skip shifting is provided in reverse, although skip shifting could also be performed in the reverse gears in alternative embodiments. Instead, transmission 14 will shift through each sequential reverse gear at the predetermined manual shift period (e.g., 0.5 seconds) per shift to reach the commanded reverse gear ratio.

In one embodiment, skip shifting is only performed for the higher forward gear ratios. Forward skip shifting depends upon whether the transmission is shifting up or down. When forward upshifting to a commanded gear ratio below or equal to a predetermined minimum skip gear ratio (e.g., $13^{th}$ forward gear ratio), controller 42 directly engages the commanded gear ratio and skip upshifting is not performed. When forward upshifting to a commanded gear above this minimum skip gear ratio, however, controller 42 directly engages that minimum skip gear ratio, and then continues to upshift at the manual shift period per shift in predetermined upshift skip increments until the commanded gear ratio is reached. The upshift skip increments are determined by controller 42 using the current gear ratio to index an upshift skip table stored in memory circuit 316 as described below.

When forward downshifting with the current gear ratio less than or equal to the predetermined minimum skip gear ratio, controller 42 directly engages the commanded gear ratio and skip downshifting is not performed. However, when forward downshifting with the current gear ratio above the minimum skip gear ratio, controller 42 downshifts at the manual shift period per shift in predetermined downshift increments until either the commanded gear ratio or the minimum skip gear ratio is reached. The downshift skip increments are also determined using the current gear ratio to index the contents of a downshift skip table stored in memory circuit 316, as described below. In this latter case, which occurs when the commanded gear ratio is below the minimum skip gear ratio, controller 42 then directly downshifts from the minimum skip gear ratio to the commanded gear ratio.

Controller 42 does not presently provide skip shifting through the reverse gear ratios. Instead, controller 42 sequentially shifts transmission 14 through each reverse gear at the manual shift period (e.g., 0.5 seconds) per shift until the commanded gear ratio is reached. Alternatively, in other applications, skip shifting through the reverse gear ratios could be provided by using the current reverse gear ratio to index the contents of a downshift skip table stored in memory circuit 316 in a similar manner to that of the forward gear ratios.

As discussed above, during certain forward engagement, upshifting and downshifting, and forward shuttle shifting operations, controller 42 accesses upshift and downshift skip tables stored in memory circuit 316 to determine skip increment values which are associated with the current gear ratio of transmission 14. In one embodiment, the upshift and downshift skip tables are as follows:

| UPSHIFT SKIP TABLE | |
|---|---|
| Gear Ratio | Upshift Skip Gear Ratio |
| 0 | 0 |
| F1 | 2 |
| F2 | 2 |
| F3 | 2 |
| F4 | 2 |
| F5 | 2 |
| F6 | 2 |
| F7 | 2 |
| F8 | 2 |
| F9 | 2 |
| F10 | 2 |
| F11 | 2 |
| F12 | 2 |
| F13 | 2 |
| F14 | 2 |
| F15 | 2 |
| F16 | 2 |
| F17 | 1 |
| F18 | 0 |

| DOWNSHIFT SKIP TABLE | |
|---|---|
| Gear Ratio | Downshift Skip Gear Ratio |
| 0 | 0 |
| F1 | 0 |
| F2 | 1 |
| F3 | 2 |
| F4 | 3 |
| F5 | 4 |
| F6 | 2 |
| F7 | 2 |
| F8 | 2 |
| F9 | 2 |
| F10 | 2 |
| F11 | 2 |
| F12 | 2 |
| F13 | 2 |
| F14 | 2 |
| F15 | 2 |
| F16 | 2 |
| F17 | 2 |
| F18 | 2 |

The index to each look-up table is the current gear ratio. During upshifting, for example, the upshift skip table provides an upshift skip increment value of 2 when the current gear ratio is the $16^{th}$ gear ratio, and provides an upshift skip increment value of 1 when the current gear ratio is the $17^{th}$ gear ratio. As will be apparent to a person of ordinary skill in the art, the skip shift values in the above table can be set to a constant number for each gear ratio to provide for skipping a constant number of gear ratios, or can be set to varying numbers to provide for skipping a variable number of gear ratios. Also, the skip shift values can be set to values of 2, 3, 4 or higher numbers to allow skip shifts by any number of gear ratios. Further, by setting the skip shift value to 1, the tables provide a convenient way of disabling skip shifting for one or more predetermined current gear ratios.

The shift skip tables are predetermined by the transmission engineer for the particular engine/transmission system. One factor to consider is the gear ratio spacing for the particular transmission. When the transmission has a number of gear ratios spaced closely together, the tables may allow for a higher number of skip shifts to allow the operator to shift through those gear ratios faster. Conversely, where the spacing between adjacent gear ratios is relatively large, the tables may allow for only a low number of skip shifts or may disable skip shifting altogether (e.g., by associating a "1" skip shift value with particular gear ratios). Higher skip shift values allow the operator to shift transmission 14 more quickly. However, this performance improvement must be balanced against adverse effects on shift quality. The skip upshift values must be limited to avoid placing too large an instantaneous load increase on the engine. For example, when the change between adjacent gear ratios is relatively large, allowing a large number of skip upshifts may cause too large an increase in torque to be placed on the engine, thereby causing the engine to lug down or causing engine speed to continuously accelerate and decelerate while shifting. Conversely, skip downshift values must be limited to avoid causing engine overspeeds due to instantaneous load reductions. Thus, the shift skip tables are set up based upon the engine/transmission combination and acceptable shift quality. After being created, the tables can be easily modified during testing of the transmission in the particular vehicle to determine the optimum table values under a range of operating conditions.

The use of the upshift and downshift skip tables is best illustrated by examples of transmission operation during forward engagement, during upshifting and downshifting, and during forward shuttle shifting. The use of the upshift skip table during exemplary forward engagements is first described. Assume, for example, that the operator commands a forward engagement of transmission 14 by moving FNRP lever 72 from the "neutral" to the "forward" position with the selected forward gear ratio being $8^{th}$ gear ratio ("F8"). Since the commanded gear ratio (i.e., $8^{th}$ gear ratio) is less than the predetermined maximum forward shuttle gear ratio (i.e., $13^{th}$ gear ratio), controller 42 performs clutch actuations to directly engage the $8^{th}$ gear ratio (i.e., by engaging clutches 156, 170 and 192). In this situation, controller 42 does not need to access the upshift skip table. Now assume the operator commands a forward engagement of transmission 14 with the selected forward gear ratio being the $17^{th}$ gear ratio. Since the commanded gear ratio is above the $13^{th}$ gear ratio, controller 42 directly engages the $13^{th}$ gear ratio, and then accesses the upshift skip table stored in memory circuit 316 using the current gear ratio as an index to determine the upshift skip increment value (i.e., 2). Controller 42 then performs clutch actuations to skip upshift by 2 from the $13^{th}$ to the $15^{th}$ gear ratio (i.e., by engaging clutches 154, 172 and 194). Since the current gear ratio is still below the commanded gear ratio, controller 42 accesses the upshift skip table again using the new current gear ratio as an index to obtain the upshift skip increment value (i.e., again 2). Controller 42 then performs clutch actuations to skip upshift by 2 from the $15^{th}$ gear ratio to the $17^{th}$ gear ratio (i.e., by engaging clutches 154, 174 and 194). Each shift is performed at the manual shift period (e.g., 0.5 seconds) per shift. Since the current gear ratio has now reached the commanded gear ratio, the forward engagement of transmission 14 is complete.

The use of the upshift and downshift skip tables during exemplary upshifting and downshifting is next described. Assume the operator upshifts transmission 14 from the $2^{nd}$ to the $17^{th}$ gear ratio using bump lever 74 with FNRP lever 72 in the "forward" position. The response by controller 42 depends upon the manner in which bump lever 74 is actuated. In the first case, assume that lever 74 is actuated to the increment position for relatively short periods (e.g., pressing lever 74 for 0.5 seconds and then releasing) at a relatively slow rate (e.g., once each 2 seconds). Since lever 74 is actuated for less than the predetermined slow bump time period of 1.0 second, each actuation of lever 74 causes the commanded gear ratio to increment by one. Then, since the actuation rate of lever 74 is slower than the manual shift period per shift of 0.5 second, controller 42 performs clutch actuations to sequentially increment the current gear ratio of transmission 14 by one for each actuation of lever 74. Skip upshifting is not performed since transmission 14 is able to keep up with the commanded gear ratio.

In the second case, assume bump lever 74 is held in its increment position until the $17^{th}$ gear ratio is reached. In this case, the commanded gear ratio is incremented by one for each predetermined fast bump period of 1.0 second that elapses until lever 74 is released. Since the rate at which the commanded gear ratio is incremented (i.e., once each 1.0 second) is slower than the manual shift period per shift of 0.5 second, controller 42 performs clutch actuations to sequentially increment the current gear ratio of transmission 14 by one for each 1.0 second that lever 74 was held in its increment position. Thus, skip upshifting is again not performed since transmission 14 is able to keep up with the commanded gear ratio.

In the third case, assume bump lever 74 is actuated to the increment position for relatively short periods (e.g., pressing lever 74 for 0.2 seconds and then releasing) at a fast rate (e.g., once each 0.4 seconds). Since the actuations of lever 74 are for less than the slow bump time period of 1.0 second, each actuation of lever 74 causes the commanded gear ratio to increment by one. However, unlike the first case, since the actuation rate of lever 74 is faster than the manual shift period per shift of 0.5 second, controller 42 will be unable to sequentially increment the current gear ratio of transmission 14 fast enough to keep up with the commanded gear ratio. To handle this situation, controller 42 compares the current gear ratio with the commanded gear ratio. When the commanded gear ratio differs from the current gear ratio by more than a predetermined amount (e.g., by more than one gear ratio), controller 42 invokes the above-described forward skip upshifting logic. Assume, e.g., that the commanded gear ratio has reached the $8^{th}$ gear ratio while the current gear ratio is the $4^{th}$ gear ratio. Since the commanded gear ratio is below the predetermined minimum skip gear ratio (e.g., $13^{th}$ gear ratio), controller 42 directly engages the commanded gear ratio and skip upshifting is not performed. Now, however, assume the commanded gear ratio has reached the $17^{th}$ gear ratio while the current gear ratio is still the $15^{th}$ gear ratio. Since the commanded gear ratio is above the minimum skip gear ratio, controller 42 accesses the upshift skip table using the current gear ratio (i.e., $15^{th}$ gear ratio) as an index to determine the upshift skip increment value (i.e., 2), and then skip upshifts by this value to reach the $17^{th}$ gear ratio. Thus, skip upshifting enables transmission 14 to reach the commanded gear more quickly.

Now, assume the operator downshifts transmission 14 from the $17^{th}$ to the $2^{nd}$ gear ratio using bump lever 74 with FNRP lever 72 in the "forward" position. Again, the response by controller 42 depends upon the manner in which bump lever 74 is actuated. In the first case, assume lever 74 is actuated to the decrement position for relatively short periods (e.g., pressing lever 74 for 0.5 seconds and then releasing) at a relatively slow rate (e.g., once each 2 seconds). Since lever 74 is actuated for less than the slow bump time period of 1.0 second, each actuation of lever 74 causes the commanded gear ratio to decrement by one. Then, since the actuation rate of lever 74 is slower than the manual shift period per shift of 0.5 second, controller 42 performs clutch actuations to sequentially decrement the current gear ratio of transmission 14 by one for each actuation of lever 74. Skip downshifting is not performed since transmission 14 is able to keep up with the commanded gear ratio.

In the second case, assume bump lever 74 is held in its decrement position until the $2^{nd}$ gear ratio is reached. In this case, the commanded gear ratio is decremented by one for each predetermined fast bump period of 1.0 seconds that elapses until lever 74 is released. Since the rate at which the commanded gear ratio is decremented (i.e., once each 1.0 second) is slower than the manual shift period per shift of 0.5 second, controller 42 performs clutch actuations to sequentially decrement the current gear ratio of transmission 14 by one for each 1.0 seconds that lever 74 was held in its decrement position. Thus, skip downshifting is again not performed since transmission 14 is able to keep up with the commanded gear ratio.

In the third case, assume bump lever 74 is actuated to the decrement position for relatively short periods (e.g., pressing lever 74 for 0.2 seconds and then releasing) at a fast rate (e.g., once each 0.4 seconds). Since the actuations of lever 74 are for less than the slow bump time period of 1.0 second, each actuation of lever 74 causes the commanded gear ratio to decrement by one. However, unlike the first case, since the actuation rate of lever 74 is faster than the manual shift period per shift of 0.5 second, controller 42 will be unable to sequentially decrement the current gear ratio of transmission 14 fast enough to keep up with the commanded gear ratio. To handle this situation, controller 42 compares the current gear ratio with the commanded gear ratio. When the commanded gear ratio differs from the current gear ratio by more than a predetermined amount (e.g., by more than one gear ratio), controller 42 invokes the above-described forward skip downshifting logic. Assume, e.g., that the commanded gear ratio has reached the $12^{th}$ gear ratio while the current gear ratio is the $15^{th}$ gear ratio. Since the current gear ratio is above the minimum skip gear ratio, controller 42 accesses the downshift skip table using the current gear ratio (e.g., $15^{th}$ gear ratio) as an index to determine the downshift skip increment value (i.e., 2), and then skip downshifts by this value to reach the $13^{th}$ gear ratio. At this point, since the commanded gear ratio is below the minimum skip gear ratio, controller 42 then directly downshifts to the commanded gear ratio. Thus, skip downshifting enables transmission 14 to reach the commanded gear more quickly.

The use of the upshift skip table for forward shuttle shifting is now described. Assume, for example, the operator commands a forward shuttle shift by moving FNRP lever 72 from the "reverse" to the "forward" position with the preselected forward gear ratio being the $8^{th}$ gear ratio. Controller 42 first places transmission 14 in neutral for the dump time of 0.5 seconds to ensure full release of the master clutch. Then, since the commanded gear ratio (i.e., $8^{th}$ gear ratio) is less than the maximum forward shuttle gear ratio (i.e., $13^{th}$ gear ratio), controller 42 performs clutch actuations to directly engage the $8^{th}$ gear ratio (i.e., by engaging clutches 156, 170 and 192). In this situation, controller 42 does not need to access the upshift skip table. Now assume the operator commands a forward shuttle shift with the preselected forward gear ratio being the $17^{th}$ gear ratio. Since the commanded gear ratio is above the $13^{th}$ gear ratio, controller 42 directly engages the $13^{th}$ gear ratio, and then accesses the upshift skip table using the current gear ratio as an index to determine the upshift skip increment value (i.e., 2). Controller 42 then performs clutch actuations to skip upshift by 2 from the $13^{th}$ to the $15^{th}$ gear ratio (i.e., by engaging clutches 154, 172 and 194). Since the current gear ratio is still below the commanded gear ratio, controller 42 accesses the upshift skip table again using the new current gear ratio as an index to obtain the upshift skip increment value (i.e., again 2). Controller 42 performs clutch actuations to skip upshift by 2 from the $15^{th}$ gear ratio to the $17^{th}$ gear ratio (i.e., by engaging clutches 154, 174 and 194). Each shift is performed at the manual shift period (e.g., 0.5 seconds) per shift. Since the current gear ratio has now reached the commanded gear ratio, the forward shuttle shifting of transmission 14 is complete. Again, skip upshifting enables transmission 14 to reach the commanded gear more quickly.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, other types of input devices could be used to generate the transmission command signals, and the values of any constants or the skip shift tables could be modified. In addition, skip shifting could be provided for the reverse gear ratios, and skip shifting could be allowed in the lower forward gear ratios as well as the higher forward gear ratios. Other modifications will be evident to those with ordinary skill in the art.

What is claimed is:

1. A control system for a transmission in a work vehicle including an engine and driven wheels, the transmission being coupled between the engine and the driven wheels and including a plurality of gears and associated clutches, the clutches engageable in predetermined combinations by an actuating circuit to define transmission gear ratios between an output speed of the engine and an output speed of the transmission, the control system comprising:

an operator-actuated input device for generating transmission command signals;

a memory circuit for storing a plurality of independent skip shift values, each skip shift value stored in association with a particular gear ratio; and a control circuit coupled to the input device and the memory circuit, the control circuit configured to receive the transmission command signals and to selectively engage the clutches at a predetermined shift rate to shift the transmission in response to the transmission command signals, wherein the transmission is shifted to provide a current gear ratio;

wherein the control circuit determines a commanded gear ratio based at least in part upon the transmission command signals and, when the commanded gear ratio differs from the current gear ratio by more than a predetermined number of gear ratios, the control circuit accesses the memory circuit to determine the skip shift value associated with the current gear ratio and selectively engages the clutches to skip shift from the current gear ratio to the commanded gear ratio by a number of gear ratios determined by the accessed skip shift value.

2. The control system of claim 1, wherein the input device includes upshift and downshift positions and generates upshift and downshift command signals when actuated into the upshift and downshift positions, respectively, and the control circuit receives the upshift and the downshift command signals from the input device, and increments and decrements the commanded gear ratio in response to the upshift and downshift command signals, respectively.

3. The control system of claim 2, wherein the control circuit selectively engages the clutches to upshift and to downshift the transmission by one gear ratio in response to each actuation of the input device into the upshift and the downshift position, respectively, when the actuation rate of the input device is slower than the predetermined shift rate.

4. The control system of claim 3, wherein the control circuit selectively engages the clutches to skip upshift and to skip downshift the transmission by the number of gear ratios determined by the accessed skip shift value when the actuation rate of the input device into the upshift and the downshift position, respectively, is faster than the predetermined shift rate.

5. The control system of claim 1, wherein the input device includes forward and reverse positions and generates forward and reverse command signals when actuated into the forward and reverse positions, respectively, and the control circuit sets the commanded gear ratio to a preselected forward gear ratio in response to receiving the forward command signal and to a preselected reverse gear ratio in response to receiving the reverse command signal.

6. The control system of claim 5, wherein the control circuit is further configured to perform a shuttle shifting operation by selectively engaging the clutches to continuously shift the transmission between the forward and the reverse preselected gear ratios as the input device is continuously actuated between its forward and reverse position.

7. The control system of claim 5, wherein the input device also includes a neutral position, and the control circuit performs forward and reverse engagements by selectively engaging the clutches to shift the transmission between a neutral state when the input device is in the neutral position and one of a preselected forward gear ratio and a preselected reverse gear ratio as the input device is actuated to its forward and reverse position, respectively.

8. A control system for a transmission in a work vehicle including an engine and driven wheels, the transmission being coupled between the engine and the driven wheels and including a plurality of gears and associated clutches, the clutches engageable in predetermined combinations by an actuating circuit to define transmission gear ratios between an output speed of the engine and an output speed of the transmission, the control system comprising:

an operator-actuated input device for commanding upshifts and downshifts of the transmission, the input device having an upshift position and a downshift position, the input device configured to generate an upshift signal and a downshift signal in response to actuation of the input device into the upshift position and the downshift position, respectively;

a memory circuit for storing a plurality of independent skip shift values, each skip shift value stored in association with a particular gear ratio; and a control circuit coupled to the input device and the memory circuit, the control circuit configured to receive the upshift and the downshift signals from the input device, and to selectively engage the clutches to upshift and to downshift the transmission in response to the upshift signal and the downshift signal, respectively, the upshifts and downshifts occurring at predetermined shift rates, wherein the transmission is shifted to provide a current gear ratio;

wherein the control circuit determines a commanded gear ratio based upon the upshift and downshift signals received from the input device and, when the commanded gear ratio differs from the current gear ratio by more than a predetermined number of gear ratios, accesses the memory circuit to determine the skip shift value associated with the current gear ratio and selectively engages the clutches to skip shift from the current gear ratio to the commanded gear ratio by a number of gear ratios determined by the accessed skip shift value.

9. The control system of claim 8, wherein the work vehicle includes a throttle lever for providing a speed control signal for the engine, and the input device includes a bump switch coupled to the throttle lever and having the upshift position and the downshift position.

10. The control system of claim 8, wherein actuation of the input device into the upshift and the downshift position for less than a predetermined time period corresponds to the commanded gear ratio being incremented and decremented by one gear ratio, respectively.

11. The control system of claim 10, wherein actuation of the input device into the upshift and the downshift position for more than the predetermined time period corresponds to the commanded gear ratio being incremented and decremented by one gear ratio for each of a second predetermined time period that the input device remains in the actuated position.

12. The control system of claim 8, wherein the memory circuit stores a skip shift table including upshift and downshift skip tables, the upshift skip table storing upshift skip shift values and the downshift skip table storing downshift skip shift values, the control circuit further configured to access the upshift skip table when the commanded gear ratio is higher than the current gear ratio and to access the downshift skip table when the commanded gear ratio is lower than the current gear ratio.

13. The control system of claim 8, wherein the skip shift value associated with at least one gear ratio of the transmission is indicative of skipping only one gear ratio such that skip shifting is disabled when the current gear ratio is the at least one gear ratio.

14. The control system of claim 8, wherein the skip shift value associated with a first gear ratio differs from the skip shift value stored in association with a second gear ratio so that a variable number of gear ratios can be skipped depending upon the current gear ratio.

15. The control system of claim 8, wherein to upshift to a commanded gear ratio below a predefined gear ratio, the control circuit directly engages the commanded gear ratio.

16. The control system of claim 15, wherein to upshift to a commanded gear ratio above the predefined gear ratio, the control circuit directly engages the predefined gear ratio and then continues to upshift by a number of gear ratios determined by the skip shift values.

17. The control system of claim 15, wherein to downshift with the current gear ratio below the predefined gear ratio, the control circuit directly engages the predefined gear ratio.

18. The control system of claim 17, wherein to downshift with the current gear ratio above the predefined gear ratio, the control circuit downshifts by a number of gears determined by the skip shift values to reach either the commanded gear ratio or the predefined gear ratio and, when the commanded gear ratio is below the predefined gear ratio, then directly engages the commanded gear ratio from the predefined gear ratio.

19. The control system of claim 8 further comprising a second operator-actuated input device having a forward position and a reverse position for selecting between a preselected forward gear ratio and a preselected reverse gear ratio, wherein the control circuit is configured to perform a shuttle-shifting operation by selectively engaging the clutches to continuously shift the transmission between the forward and the reverse preselected gear ratios as the second input device is continuously actuated between its forward and reverse positions.

20. A control system for a transmission in a work vehicle including an engine and driven wheels, the transmission being coupled between the engine and the driven wheels and including a plurality of gears and associated clutches, the clutches engageable in predetermined combinations by an actuating circuit to define transmission gear ratios between an output speed of the engine and an output speed of the transmission, the control system comprising:

- actuating means for commanding upshifts and downshifts of the transmission;
- memory means for storing a plurality of independent skip shift values, each skip shift value stored in association with a particular gear ratio;
- first control means for selectively engaging the clutches to upshift and downshift the transmission to provide a current gear ratio as commanded by the actuating means, the upshifts and downshifts of the transmission occurring at predetermined shift rates; and
- second control means for determining a commanded gear ratio for the transmission and, when the commanded gear ratio differs from the current gear ratio by more than a predetermined number of gear ratios, accessing the memory means to determine the skip shift value associated with the current gear ratio and selectively engaging the clutches to skip shift from the current gear ratio to the commanded gear ratio by a number of gear ratios determined by the accessed value.

21. The control system of claim 20, wherein the memory means stores a skip shift table including upshift and downshift skip tables, the upshift skip table storing upshift skip shift values and the downshift skip table storing downshift skip shift values, and wherein the second control means accesses the upshift skip table when the commanded gear ratio is higher than the current gear ratio and the downshift skip table when the commanded gear ratio is lower than the current gear ratio.

22. The control system of claim 20, wherein the skip shift value associated with at least one gear ratio of the transmission is indicative of skipping only one gear ratio so that skip shifting is disabled when the current gear ratio is the at least one gear ratio.

23. The control system of claim 20, wherein the skip shift value associated with a first gear ratio differs from the skip shift value stored in association with a second gear ratio so that a variable number of gear ratios can be skipped depending upon the current gear ratio.

24. The control system of claim 20 further comprising second actuating means for selecting between a preselected forward gear ratio and a preselected reverse gear ratio, and means for shuttle-shifting the transmission by selectively engaging the clutches to continuously shift the transmission between the forward and reverse preselected gear ratios as the second actuating means is continuously actuated between forward and reverse positions.

25. A method of controlling a transmission in a work vehicle including an engine and driven wheels, the transmission being coupled between the engine and the driven wheels and including a plurality of gears and associated clutches, the clutches being engageable in predetermined combinations by an actuating circuit to define transmission gear ratios between an output speed of the engine and an output speed of the transmission, the method comprising:

- storing a plurality of independent skip shift values in a memory, each skip shift value stored in association with a particular gear ratio of the transmission;
- actuating an input device to command shifts of the transmission;
- selectively engaging the clutches to shift the transmission to provide a current gear ratio as commanded by the input device, the shifts occurring at predetermined shift rates;
- determining a commanded gear ratio based on the input device actuations; and
- comparing the commanded gear ratio to the current gear ratio and, when the commanded gear ratio differs from the current gear ratio by more than a predetermined number of gear ratios, accessing the memory to determine the skip shift value associated with the current gear ratio and selectively engaging the clutches to skip shift from the current to the commanded gear ratio by a number of gear ratios determined by the accessed skip shift value.

26. The method of claim 25, wherein the storing step includes storing an upshift skip table and a downshift skip table, and the accessing step includes accessing the upshift skip table when the commanded gear ratio is higher than the current gear ratio and accessing the downshift skip table when the commanded gear ratio is lower than the current gear ratio.

* * * * *